(12) United States Patent
Baijal et al.

(10) Patent No.: US 11,928,793 B2
(45) Date of Patent: Mar. 12, 2024

(54) VIDEO QUALITY ASSESSMENT METHOD AND APPARATUS

(71) Applicant: SAMSUNG ELECTRONICS CO., LTD., Suwon-si (KR)

(72) Inventors: Anant Baijal, Suwon-si (KR); Hoshin Son, Suwon-si (KR); Eunae Cho, Suwon-si (KR); Sangshin Park, Suwon-si (KR); Seungwon Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 17/354,646

(22) Filed: Jun. 22, 2021

(65) Prior Publication Data
US 2021/0398265 A1 Dec. 23, 2021

(30) Foreign Application Priority Data

Jun. 23, 2020 (KR) .................. 10-2020-0076767

(51) Int. Cl.
*G06T 5/00* (2006.01)
*G06F 18/214* (2023.01)
(Continued)

(52) U.S. Cl.
CPC ............ *G06T 5/001* (2013.01); *G06F 18/214* (2023.01); *G06T 7/0002* (2013.01);
(Continued)

(58) Field of Classification Search
CPC .................. G06T 5/001; G06T 7/0002; G06T 2207/10016; G06T 2207/20081;
(Continued)

(56) References Cited

U.S. PATENT DOCUMENTS 6,298,145 B1 * 10/2001 Zhang .................. G06V 40/161
348/169
7,873,224 B2 1/2011 Jalil et al.
(Continued)

FOREIGN PATENT DOCUMENTS

EP 1 457 927 A2 9/2004
KR 10-0943595 B1 2/2010
(Continued)

OTHER PUBLICATIONS

Hatef et al., ("No-Reference Video Quality Assessment using Recurrent Neural Networks", IEEE 2019) (Year: 2019).*
(Continued)

*Primary Examiner* — Amara Abdi
(74) *Attorney, Agent, or Firm* — Sughrue Mion, PLLC

(57) ABSTRACT

A video quality assessment apparatus and method are provided. The video quality assessment apparatus includes a memory storing one or more instructions; and a processor configured to execute the one or more instructions stored in the memory to: identify whether a frame included in a video is a fully-blurred frame or a partially-blurred frame based on a blur level of the frame, obtain, in response to the frame being the fully-blurred frame, an analysis-based quality score with respect to the fully-blurred frame; obtain, in response to the frame being the partially-blurred frame, a model-based quality score with respect to the partially-blurred frame; and process the video based on at least one of the analysis-based quality score or the model-based quality score to obtain a processed video.

20 Claims, 19 Drawing Sheets

(51) Int. Cl.
*G06T 7/00* (2017.01)
*G06V 10/764* (2022.01)
*G06V 20/40* (2022.01)

(52) U.S. Cl.
CPC ............ *G06V 10/764* (2022.01); *G06V 20/40* (2022.01); *G06V 20/41* (2022.01); *G06V 20/46* (2022.01); *G06T 2207/10016* (2013.01); *G06T 2207/20081* (2013.01); *G06T 2207/20084* (2013.01)

(58) Field of Classification Search
CPC . G06T 2207/20084; G06T 2207/30168; G06F 18/214; G06V 10/764; G06V 20/40; G06V 20/41; G06V 20/46; H04N 17/00
See application file for complete search history.

(56) References Cited

U.S. PATENT DOCUMENTS

| | | | |
|---|---|---|---|
| 8,422,795 B2 | 4/2013 | Pahalawatta et al. | |
| 9,143,776 B2 | 9/2015 | Zhang et al. | |
| 9,706,111 B2 | 7/2017 | Saad et al. | |
| 10,819,983 B1* | 10/2020 | Wang | G06V 20/40 |
| 11,386,663 B1* | 7/2022 | Perea | G06V 20/46 |
| 2004/0252890 A1* | 12/2004 | Lim | G06T 7/0002 |
| | | | 382/191 |
| 2007/0055519 A1* | 3/2007 | Seltzer | G10L 21/038 |
| | | | 704/251 |
| 2020/0084367 A1 | 3/2020 | Amini et al. | |
| 2020/0226740 A1* | 7/2020 | Otroshi Shahreza | G06N 20/10 |

FOREIGN PATENT DOCUMENTS

| | | | | |
|---|---|---|---|---|
| KR | 10-1279705 B1 | | 6/2013 | |
| KR | 101279705 | * | 6/2013 | ........... G06T 7/0002 |
| KR | 10-1316699 B1 | | 10/2013 | |
| KR | 10-2019-0076288 A | | 7/2019 | |
| KR | 20190076288 | * | 7/2019 | ............... G06N 3/08 |

OTHER PUBLICATIONS

Kongfeng et al., (No-Reference Video Quality Assessment Based on Artifact Measurement and Statistical Analysis, IEEE, vol. 25, No. 4, Apr. 2015) (Year: 2015).*
Wang et al., (video quality assessment using structural distortion measurement, IEEE ICIP 2002) (Year: 2002).*
International Search Report and Written Opinion dated Sep. 13, 2021, issued by the International Searching Authority in International Application No. PCT/KR2021/007499 (PCT/ISA/220, 210, 237).
Communication dated Oct. 25, 2023, issued by European Patent Office In European Patent Application No. 21829285.2.

* cited by examiner

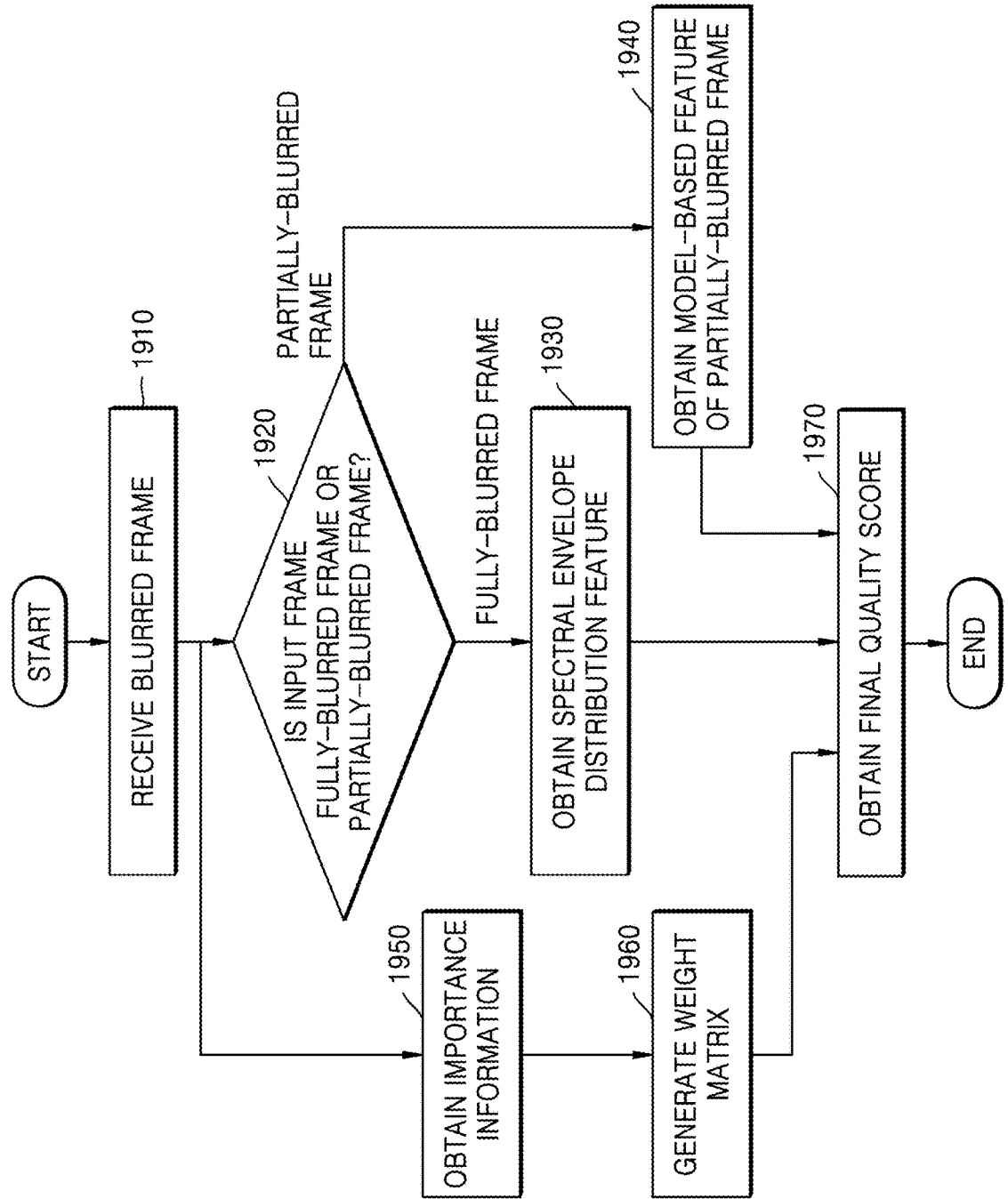

VIDEO QUALITY ASSESSMENT METHOD AND APPARATUS

CROSS-REFERENCE TO RELATED APPLICATION(S)

This application is based on and claims priority under 35 U.S.C. § 119 to Korean Patent Application No. 10-2020-0076767, filed on Jun. 23, 2020, in the Korean Intellectual Property Office, the disclosure of which is incorporated by reference herein in its entirety.

BACKGROUND

1. Field

The disclosure relates to a video quality assessment method and apparatus, and more particularly, to a video quality assessment method and apparatus for assessing the quality of a frame in a video based on a blur level of the frame.

2. Description of Related Art

Distortion occurs in video images during a process of generation, compression, storage, transmission, and reproduction. Distorted images must be reproduced within an allowable range of human perception. Therefore, before an image is reproduced, it is necessary to quantify and assess the quality in order to understand how this distortion affects the quality to be perceived by humans.

Image quality may be assessed using a subjective quality assessment method and an objective quality assessment method. The subjective quality assessment method may be a method by which an assessor directly watches a video and assesses quality, and may accurately reflect the quality perception characteristics of humans. However, the subjective quality assessment method has a disadvantage in that an assessment value is different for each individual, a significant amount of time and cost is required, and it is difficult to assess a quality of an image in real time.

The objective quality assessment method is a method of implementing an algorithm that quantifies quality perceived by the human optic nerve and assessing a degree of deterioration in the quality of a compressed image by using the algorithm.

The objective quality assessment method includes a full-reference quality assessment method in which a reference image is compared with a distorted image, a reduced reference quality assessment method in which quality assessment is performed using partial information about the reference image other than the reference image itself, for example, watermarking or auxiliary channels, and a no-reference quality assessment method in which quality estimation is performed using only distorted images without using any information of the reference image.

The no-reference quality assessment method does not require reference image information, and therefore may be used in any application requiring quality assessment.

SUMMARY

Provided are a video quality assessment method and apparatus for identifying a case where a frame is a fully-blurred frame and a partially-blurred frame based on a blur level of a frame included in a video, and assessing quality of the frame in a different manner in each case.

Provided are a video quality assessment method and apparatus for obtaining different features from a fully-blurred frame and a partially-blurred frame and using the different features to assess the quality of each frame.

Provided are a video quality assessment method and apparatus capable of assessing the quality of a frame included in a video in consideration of the characteristics of each sub-area of the frame by obtaining importance information and spectral envelope distribution characteristics for each sub-area, and generating and using a weight matrix therefrom.

Provided are a video quality assessment method and apparatus for assessing the quality of a frame by using a neural network that has been trained with respect to subjective assessment of human.

In accordance with an aspect of the disclosure, a video quality assessment method includes: receiving a frame of a video; identifying whether the frame is a fully-blurred frame or a partially-blurred frame based on a blur level of the frame; obtaining, in response to the frame being the fully-blurred frame, an analysis-based quality score with respect to the fully-blurred frame; obtaining, in response to the frame being the partially-blurred frame, a model-based quality score with respect to the partially-blurred frame; and processing the video based on at least one of the analysis-based quality score or the model-based quality score to obtain a processed video.

The video quality assessment method may further include: obtaining a spectral envelope with respect to each of a plurality of sub-areas included in the frame; and estimating the blur level for each of the plurality of sub-areas based on the spectral envelope. The identifying whether the frame is the fully-blurred frame or the partially-blurred frame may include identifying whether a number of the plurality of sub-areas in which the blur level estimated based on the spectral envelope exceeds a threshold value.

The obtaining the spectral envelope may include, for each of the plurality of sub-areas: obtaining a signal in a frequency domain for a corresponding sub-area; obtaining a power spectrum with respect to the signal in the frequency domain; and obtaining the spectral envelope based on the power spectrum.

The obtaining the analysis-based quality score may include: obtaining a spectral envelope distribution feature based on the spectral envelope with respect to each of the plurality of sub-areas included in the fully-blurred frame; and obtaining the analysis-based quality score with respect to the fully-blurred frame by analyzing the spectral envelope distribution feature with respect to each of the plurality of sub-areas.

The video quality assessment method may further include: obtaining a spectral envelope distribution feature based on the spectral envelope with respect to each of the plurality of sub-areas included in the partially-blurred frame; obtaining importance information with respect to each of the plurality of sub-areas included in the partially-blurred frame by using a first neural network; and generating a weight matrix indicating a weight value for each of the plurality of sub-areas, based on the spectral envelope distribution feature and the importance information obtained with respect to each of the plurality of sub-areas included in the partially-blurred frame. The obtaining the model-based quality score may include obtaining the model-based quality score with respect to the partially-blurred frame based on the weight matrix and the partially-blurred frame.

The obtaining the importance information may include: obtaining for each of the plurality of sub-areas, one or more pieces of importance information related to a factor capable of affecting a quality score by using the first neural network, and the importance information may comprise at least one of information whether an object is a foreground object or a background object, semantic information, location information, or content information.

The plurality of sub-areas may include a first sub-area and a second sub-area that is adjacent the first sub-area, and the video quality assessment method may further include: correcting a first spectral envelope distribution feature of the first sub-area by using a second spectral envelope distribution feature of the second sub-area; correcting first importance information of the first sub-area by using second importance information of the second sub-area; and obtaining a corrected weight value with respect to the first sub-area by using the first spectral envelope distribution feature as corrected and the first importance information as corrected.

The obtaining the model-based quality score may be performed using a second neural network trained with respect to a correlation between a feature vector and a mean opinion score (MOS).

The obtaining the model-based quality score may include: extracting a feature from the partially-blurred frame by using the second neural network; and obtaining a quality score of the partially-blurred frame based on the feature and the weight matrix, and the feature may include at least one of a blur-related feature, a motion-related feature, a content-related feature, a deep feature, a statistical feature, a conceptual feature, a spatial feature, or a modified domain feature.

The video quality assessment method may further include: accumulating the analysis-based quality score and the model-based quality score for a plurality of frames over a period of time to obtain time-series data; and smoothing the time-series data to obtain a final quality score.

The smoothing the time-series data to obtain the final quality score may be performed using a third neural network model, and the third neural network model may include a long short-term memory (LSTM).

The processing the video may include processing the frame based on the final quality score, and the processing the video may be performed by at least one of: processing the video according to a quality processing model selected according to the final quality score, identifying a number of times to apply the quality processing model based on the final quality score, and repeatedly applying the quality processing model to the frame the number of times, identifying a filter based on the final quality score, and processing the video by applying the filter to the frame, or processing the video by using a neural network of a hyperparameter value corrected according to the final quality score.

In accordance with an aspect of the disclosure, a video quality assessment method includes: receiving a frame of a video; identifying whether the frame is a fully-blurred frame or a partially-blurred frame based on a blur level of the frame; obtaining, in response to the frame being the fully-blurred frame, a spectral envelope distribution feature of the fully-blurred frame; obtaining, in response to the frame being the partially-blurred frame, a model-based feature of the partially-blurred frame; obtaining a final quality score with respect to the frame based on at least one of the spectral envelope distribution feature or the model-based feature; and processing the video based on the final quality score to obtain a processed video.

The video quality assessment method may further include: obtaining importance information with respect to each of a plurality of sub-areas included in the frame; obtaining the spectral envelope distribution feature with respect to each of the plurality of sub-areas included in the frame; and generating a weight matrix with respect to the frame by obtaining a weight for each of the plurality of sub-areas based on the importance information and the spectral envelope distribution feature with respect to each of the plurality of sub-areas. The obtaining the final quality score with respect to the frame may include: obtaining the final quality score with respect to the frame by using the spectral envelope distribution feature of each of the plurality of sub-areas of the fully-blurred frame, the model-based feature of the partially-blurred frame, and the weight matrix.

The obtaining the model-based feature may include extracting at least one of a blur-related feature, a motion-related feature, a content-related feature, a deep feature, a statistical feature, a conceptual feature, a spatial feature, or a modified domain feature from the partially-blurred frame by using at least one neural network.

In accordance with an aspect of the disclosure, a video quality assessment apparatus includes: a memory storing one or more instructions; and a processor configured to execute the one or more instructions stored in the memory to: identify whether a frame included in a video is a fully-blurred frame or a partially-blurred frame based on a blur level of the frame; obtain, in response to the frame being the fully-blurred frame, an analysis-based quality score with respect to the fully-blurred frame; obtain, in response to the frame being the partially-blurred frame, a model-based quality score with respect to the partially-blurred frame; and process the video based on at least one of the analysis-based quality score or the model-based quality score to obtain a processed video.

The processor may be further configured to execute the one or more instructions to: obtain a spectral envelope distribution feature from a spectral envelope with respect to each of a plurality of sub-areas included in the fully-blurred frame, and obtain the analysis-based quality score with respect to the fully-blurred frame by analyzing the spectral envelope distribution feature with respect to each of the plurality of sub-areas.

The processor may be further configured to execute the one or more instructions to: obtain a spectral envelope distribution feature based on a spectral envelope with respect to each of a plurality of sub-areas included in the partially-blurred frame; obtain importance information with respect to each of the plurality of sub-areas included in the partially-blurred frame; generate a weight matrix indicating a weight value for each sub-area, based on the spectral envelope distribution feature and the importance information obtained with respect to each of the plurality of sub-areas included in the partially-blurred frame; and obtain the model-based quality score with respect to the partially-blurred frame based on the weight matrix and the partially-blurred frame.

The video quality assessment apparatus may further comprise an output interface, and the processor is further configured to control the output interface to provide the processed video to a display panel.

The output interface may comprise the display panel, and the output interface is configured to provide a wired connection between the video quality assessment apparatus and the display panel.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 19 is a flowchart illustrating a method of assessing a video quality, according to another embodiment.

DETAILED DESCRIPTION

Figure 1:
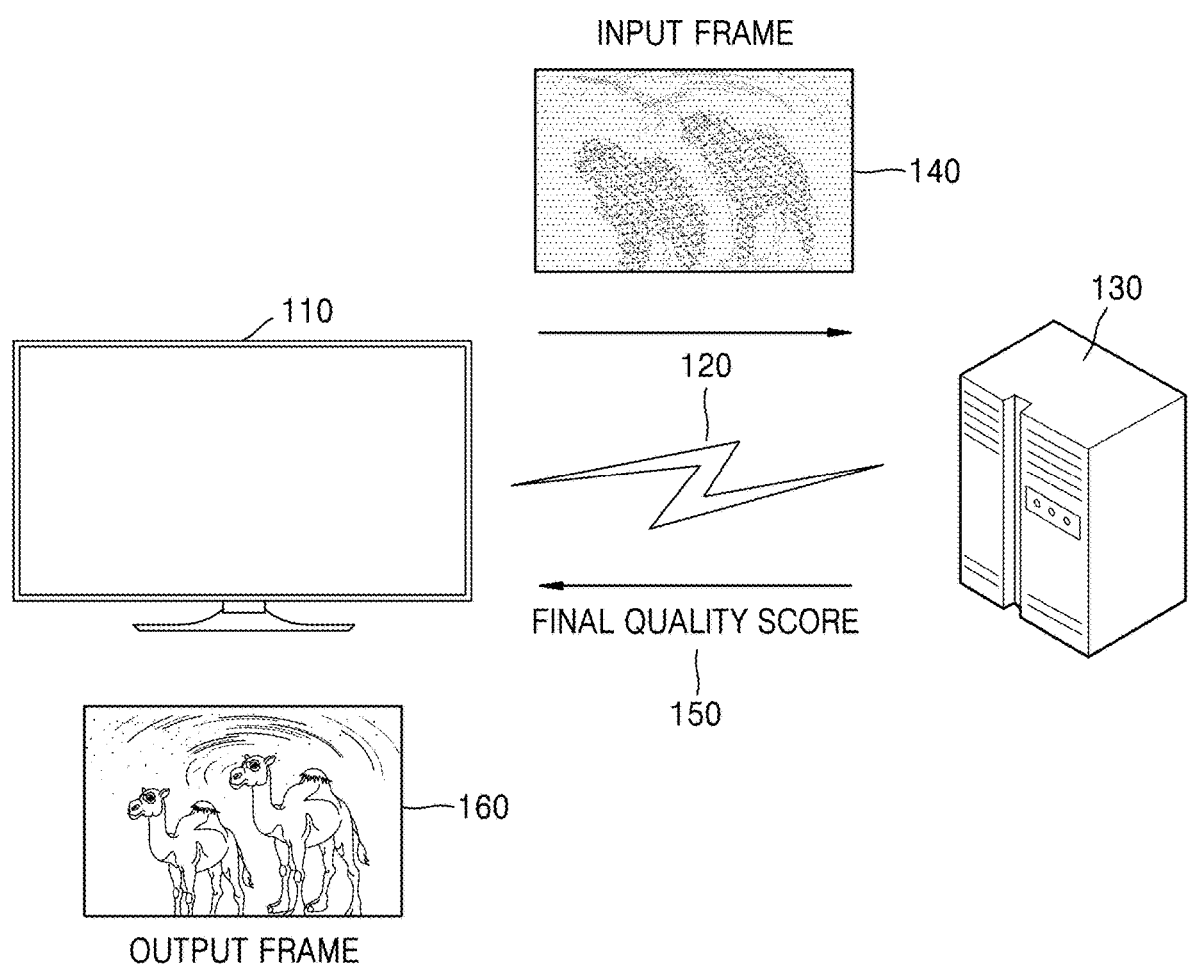
FIG. 1 is a diagram illustrating a video quality assessment apparatus generating a quality score of a video image, and an image display apparatus outputting an image having a processed quality on a screen, according to an embodiment.

Embodiments will now be described in with reference to the accompanying drawings. The disclosure may, however, be embodied in many different forms and should not be construed as being limited to the examples set forth herein.

Although general terms have been selected for describing embodiments in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

The terms used in the present specification are used to describe particular embodiments, and are not intended to limit the scope of the disclosure.

Throughout the specification, when an element is referred to as being "connected" or "coupled" to another element, it may be directly connected or coupled to the other element, or may be electrically connected or coupled to the other element with intervening elements interposed therebetween.

Throughout the disclosure, expressions such as "at least one of a, b or c" indicate only a, only b, only c, both a and b, both a and c, both b and c, all of a, b, and c, or variations thereof.

As used herein, the terms "1st" or "first" and "2nd" or "second" may use corresponding component regardless of importance or order and are used to distinguish a component from another without limiting the components. The use of the terms "a" and "an" and "the" and similar referents are to be construed to cover both the singular and the plural. Also, steps of all methods described herein may be performed in any suitable order unless otherwise indicated herein or otherwise clearly contradicted by context. Embodiments are not limited to the described order of operations.

Thus, the expression "according to an embodiment" does not necessarily indicate the same embodiment.

Embodiments may be described in terms of functional block components and various processing steps. Some or all of such functional blocks may be realized by any number of hardware and/or software components configured to perform the specified functions. For example, functional blocks may be realized by one or more microprocessors or by circuit components for a certain function. In addition, for example, functional blocks may be implemented with any programming or scripting language. The functional blocks may be implemented in algorithms that are executed on one or more processors. Furthermore, embodiments described herein could employ any number of techniques for electronics configuration, signal processing and/or control, data processing and the like. The words "mechanism," "element," "means," and "configuration" are used broadly and are not limited to mechanical or physical embodiments, Furthermore, connecting lines or connectors between components shown in the various figures presented are intended to represent exemplary functional relationships and/or physical or logical couplings between the components. Connections between components may be represented by many alternative or additional functional relationships, physical connections or logical connections in a practical device.

The terms "unit", "-er", "-or", and "module" refer to a unit in which at least one function or operation is performed, and may be implemented as hardware (i.e., a processor or a circuit), software, or a combination of hardware and software.

The term "user" used herein denotes a person who controls a function or operation of an image display apparatus by using the image display apparatus. Examples of the user may include a viewer, a manager, or an installation engineer.

Embodiments will now be described more fully with reference to the accompanying drawings.

FIG. 1 is a diagram illustrating a video quality assessment apparatus 130 generating a quality score of a video image, and an image display apparatus 110 outputting an image having a processed quality on a screen according to an embodiment.

Referring to FIG. 1, the image display apparatus 110 may communicate with the video quality assessment device 130 through a communication network 120.

The image display apparatus 110 may be an electronic apparatus capable of processing and outputting an image. The image display apparatus 110 may be stationary or mobile, and may be a digital television (TV) capable of receiving digital broadcasting, but is not limited thereto, and may be implemented as various types of electronic apparatuses including a display.

The image display apparatus 110 may include at least one of a desktop personal computer (PC), a smartphone, a tablet PC, a mobile phone, a video phone, an e-book reader, a laptop PC, a netbook computer, a digital camera, personal digital assistants (PDAs), a portable multimedia player (PMP), a camcorder, a navigation device, a wearable device, a smart watch, a home network system, a security system, or a medical device.

The image display apparatus 110 may be implemented not only as a flat display apparatus, but also as a curved display apparatus which is a screen having a curvature, or a flexible display apparatus capable of adjusting a curvature. The output resolution of the image display apparatus 110 may include, for example, high definition (HD), full HD, an ultra HD, or a resolution that is clearer than that of the ultra HD.

The image display apparatus 110 may output a video. The video may be configured as a plurality of frames. The video may include items such as TV programs provided by content providers or various movies or dramas through video on demand (VOD) services. The content provider may indicate a terrestrial broadcasting station or cable broadcasting station, or an over-the-top (OTT) service provider or an Internet Protocol television (IPTV) service provider that provides various contents including video to consumers.

The video is captured, compressed, and transmitted to the image display apparatus 110, and is reconstructed and output by the image display apparatus 110. Due to physical limitations of a device used to capture the video and a limited bandwidth, information is lost, which causes a distortion of the image. The distorted video may have deteriorated quality. The distortion of the image may include a blur. For example, an edge part of an object included in a frame looks blurry due to loss.

In an embodiment, the image display apparatus 110 may transmit an input frame 140 included in the video to the video quality assessment device 130 through the communication network 120 before outputting the input frame 140 through the screen.

In an embodiment, the video quality assessment apparatus 130 may receive the video including a plurality of frames from the image display apparatus 110 through the communication network 120 and perform quality assessment on the video.

In an embodiment, the video quality assessment apparatus 130 may be a computing apparatus that assesses a quality of the video.

The video quality assessment apparatus 130 according to an embodiment may objectively assess the quality of the video by using a no-reference quality assessment method. For example, the video quality assessment apparatus 130 may be provided in the form of at least one hardware chip that is embedded on an electronic apparatus, or may be included in a server in the form of a chip or the electronic apparatus. For example, the video quality assessment apparatus 130 may be implemented as a software module in the electronic apparatus or the server.

The video quality assessment apparatus 130 may receive the video and estimate a blur level with respect to each of the plurality of frames included in the video.

In FIG. 1, the video quality assessment apparatus 130 may divide the input frame 140 received from the image display apparatus 110 into a plurality of sub-areas, and obtain a signal in a frequency domain with respect to each sub-area. The video quality assessment apparatus 130 may obtain a spectral envelope from a signal in the frequency domain. The video quality assessment apparatus 130 may estimate a blur level of each sub-area from the spectral envelope. This will be described in detail with reference to FIGS. 2 and 3.

The video quality assessment apparatus 130 may identify a frame as a frame without blur, a fully-blurred frame or a partially-blurred frame according to the blur level.

The fully-blurred frame may indicate a frame in which a blur level is equal to or greater than a certain reference value is included in a certain area or more throughout the frame. In addition, the partially-blurred frame may indicate a frame in which the blur level is equal to or greater than the certain reference value is included in in less than the certain area of the frame.

In an embodiment, the video quality assessment apparatus 130 may obtain a graph distribution feature of the spectral envelope with respect to the frame.

In an embodiment, when it is determined that an input frame is the fully-blurred frame, the video quality assessment apparatus 130 may obtain spectral envelope distribution features of sub-areas included in the fully-blurred frame.

In an embodiment, when it is determined that the input frame is the fully-blurred frame, the video quality assessment apparatus 130 may analyze the spectral envelope distribution features of sub-areas included in the fully-blurred frame to obtain an analysis-based quality score with respect to the fully-blurred frame.

In an embodiment, when it is determined that the input frame is the partially-blurred frame, the video quality assessment apparatus 130 may obtain a model-based feature with respect to the partially-blurred frame using an artificial intelligence (AI) technology.

In an embodiment, when it is determined that the input frame is the partially-blurred frame, the video quality assessment apparatus 130 may obtain the model-based quality score with respect to the partially-blurred frame using the AI technology.

The AI technology may be configured through machine learning (deep learning). The AI technology may be implemented using a neural network that includes an algorithm or a set of algorithms. The neural network may receive input data, perform an operation for analysis and classification, and output result data.

The neural network may have a plurality of internal layers that perform operations. The neural network generates a plurality of pieces of data, that is, a feature map, representing features of an image from each of the layers. In a lower layer, a feature map that is almost the same as an input image is output, and as the layer deepens, the information of a pixel level disappears, and a detailed feature in which semantic information of the image is maintained is output.

However, when the blur level is high throughout the frame, the feature map obtained from the frame by using the neural network may include noise. In addition, an operation of obtaining the model-based quality score by using the neural network is more complex and requires a greater amount of computation than a method of obtaining an analysis-based quality score.

Accordingly, in an embodiment, the video quality assessment apparatus 130 may assess the quality of the frame in different ways according to the blur level of the input frame. That is, when the frame is the fully-blurred frame, the video quality assessment apparatus 130 may assess the quality of the frame using a simple analysis-based method rather than a complex model-based method. Further, when the frame is the partially-blurred frame, the video quality assessment apparatus 130 may assess the quality of the frame through the model-based method using at least one neural network.

The video quality assessment apparatus 130 may accumulate the analysis-based quality score and/or the model-based quality score obtained with respect to the frame (or frames) for a certain period of time (or for a certain number of frames) to obtain a final quality score 150 with respect to the video. The video quality assessment apparatus 130 may transmit the final quality score 150 to the image display apparatus 110 through the communication network 120.

In another embodiment, the video quality assessment apparatus 130 may assess the quality of the frame from different features according to the blur level of the input frame. That is, when the frame is the fully-blurred frame, the video quality assessment apparatus 130 may obtain a frequency feature from the fully-blurred frame, and when the frame is the partially-blurred frame, may obtain the model-based feature by using a model which uses at least one neural network. The video quality assessment apparatus 130 may more accurately assess the quality of the frame with respect to each frame based on different features obtained according to frame types.

The video quality assessment apparatus 130 may accumulate frequency features and/or model-based features obtained with respect to the frame (or frames) for a certain period of time to input the frequency features and/or model-based features to at least one neural network and obtain the final quality score 150 with respect to the video.

In an embodiment, the image display apparatus 110 may perform quality processing on the frames included in the video according to the final quality score 150. As described above, the image display apparatus 110 may improve the quality of frames by performing quality processing on the frames using the final quality score 150. In FIG. 1, the image display apparatus 110 may improve the resolution of the input frame 140 as an output frame 160 based on the final quality score 150 obtained from the video quality assessment apparatus 130. The image display apparatus 110 may output the output frame 160 on a display.

In another embodiment, the video quality assessment apparatus 130 may directly perform quality processing on the frames included in the video according to the final quality score 150, and transmit the quality-processed output frame 160 to the image display apparatus 110, instead of transmitting the obtained final quality score 150 to the image display apparatus 110.

In another embodiment, the video quality assessment apparatus 130 may not be separated from the image display apparatus 110 but may be included in the image display apparatus 110 to perform the functions described above. The video quality assessment apparatus 130 may be provided in the form of at least one hardware chip or implemented as a software module, or may be implemented in a form in which hardware and software are combined and embedded on the image display apparatus 110. In this case, before outputting the input frame 140 to the screen, the image display apparatus 110 may first perform quality assessment on the video including the input frame 140. The image display apparatus 110 may perform quality processing such as adjusting a distortion of the input frame 140 according to a quality assessment score, and may output the quality-processed output frame 160 to the screen.

As described above, according to an embodiment, the video quality assessment apparatus 130 may identify whether the frame is the fully-blurred frame or the partially-blurred frame by using the blur level of the frame, and accordingly, assess the quality of the frame using different methods.

According to an embodiment, the video quality assessment apparatus 130 may obtain different features from the frame according to the type of the frame to assess the quality of the frame.

According to an embodiment, the video quality assessment apparatus 130 may obtain a final quality score of a video, process quality of the video based on the final quality score, and transmit the video to the image display apparatus 110.

According to an embodiment, the video quality assessment apparatus 130 may obtain the final quality score of the video and transmit the final quality score to the image display apparatus 110, and the image display apparatus 110 may process the video to improve the quality based on the final quality score of the video and output the video.

Figure 2:
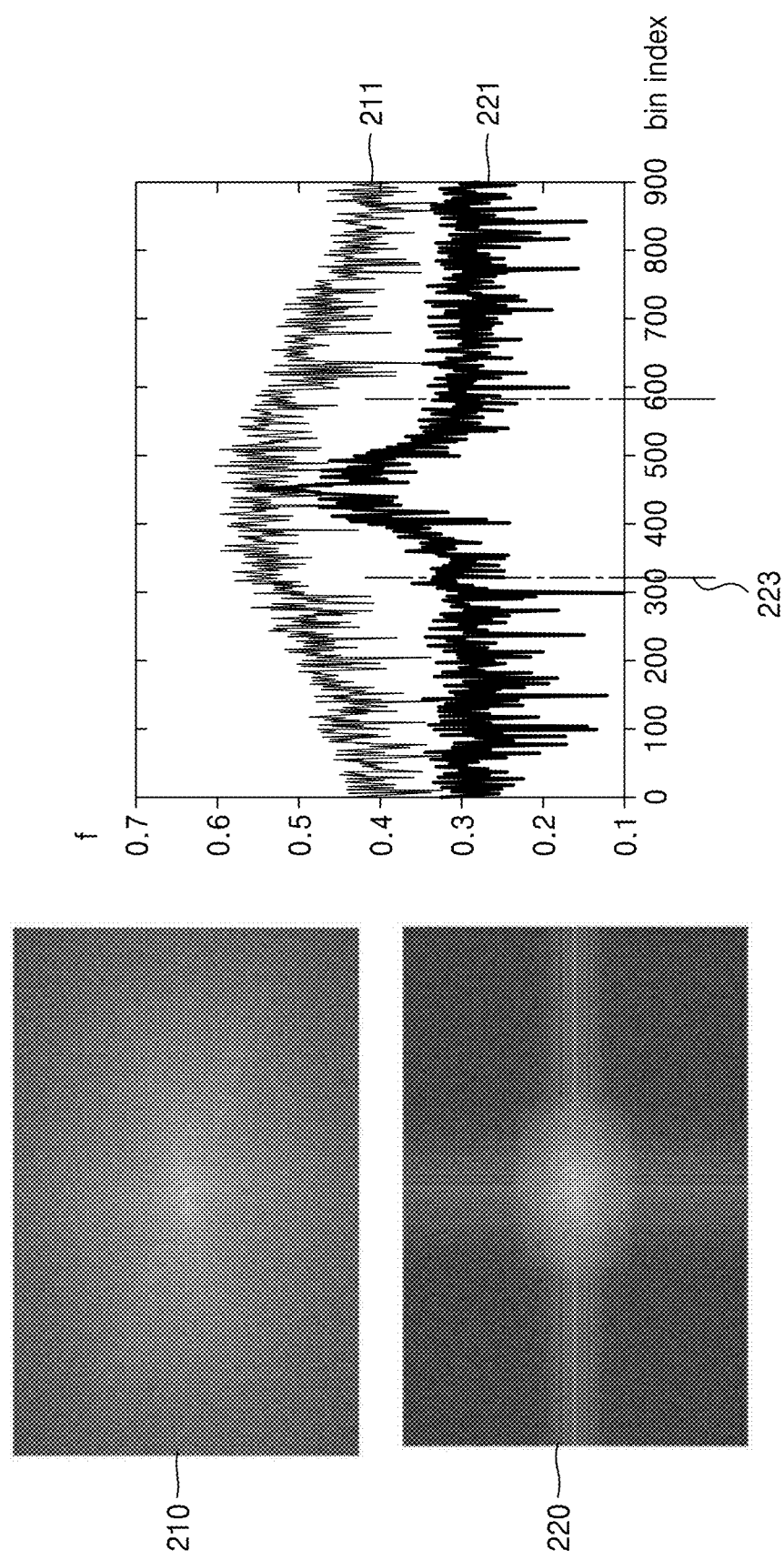
FIG. 2 is a diagram illustrating power spectra and spectral envelopes obtained from an input frame, according to an embodiment.

FIG. 2 is a diagram of power spectra 210 and 220, and spectral envelopes 211 and 221 obtained from different input frames, according to an embodiment.

The video quality assessment apparatus 130 may perform domain transformation by dividing an input frame into a plurality of sub-areas and performing a Fast Fourier Transform (FFT) on each sub-area. The video quality assessment apparatus 130 may obtain a signal in a frequency domain for each sub-area.

An image of each sub-area is a discrete signal rather than a continuous signal, and is a signal defined in a limited finite period. The video quality assessment apparatus 130 may perform Fourier transform on the image of each sub-area to decompose and express the image of each sub-area into a sum of various 2D sine waves. Assuming that the image of the sub-area is a signal $f(x, y)$ having a W×H size, the video quality assessment apparatus 130 may obtain a signal $F(u, v)$ of the frequency domain by performing a discrete Fourier transform on the image of the sub-area. Here, $F(u, v)$ denotes a coefficient of a periodic function component having a frequency u in an x-axis direction and a frequency v in a y-axis direction.

$F(u, v)$ is a complex number, and thus includes a real part and an imaginary part. The video quality assessment apparatus 130 may obtain a power spectrum from a size $|F(u, v)|$ of the complex number $F(u, v)$. The power spectrum may represent how strongly a corresponding frequency component is included in the original image. Because a low frequency area of the power spectrum has a very large value, whereas most of the other areas thereof have values approximating to 0, the power spectrum generally is expressed as a log value when the power spectrum is expressed as an image. Also, because the original power spectrum image has a larger value toward the edge, it is difficult to identify a shape of the power spectrum, and thus an image in which a spectrum is shifted such that its origin is at the center may be generated as a power spectrum image.

The two power spectra 210 and 220 are shown in the left side of FIG. 2. The power spectrum 210 obtained with respect to a clear first image is shown in the upper end of FIG. 2, and the power spectrum 220 obtained with respect to a blurry second image that is less clear than the first image is shown in the lower end of FIG. 2.

It may be seen that the power spectrum 210 obtained with respect to the first image is different than the power spectrum 220 obtained with respect to the second image. In other words, it may be seen that in the power spectrum 210 obtained with respect to the first image, a power value does not suddenly change and is filled smoothly in an entire area, whereas in the power spectrum 220 obtained with respect to the second image, a power component concentrates on a specific area with respect to the center of the power spectrum 220.

The video quality assessment apparatus 130 may obtain a spectral envelope from a power spectrum. The video quality assessment apparatus 130 may select one or a plurality of columns or rows passing through the center of the power spectrum or one or a plurality of columns or rows located within a certain distance from the center of the power spectrum, and may obtain the spectral envelope with respect to the selected column or row. The spectral envelope is a line that connects a power spectrum value from a lower frequency to a high frequency, and displays frequency characteristics of a region of interest.

The spectral envelopes 211 and 221 obtained from the power spectra 210 and 220 are shown in the right side of FIG. 2. In a right graph of FIG. 2, the x axis indicates a bin index value, and the y axis indicates a value of a spectral envelope as a frequency obtained by taking log after normalizing an absolute value of a signal.

In the right side of FIG. 2, the first spectral envelope 211 is a graph obtained from the power spectrum 210 of the first image, and the second spectral envelope 221 is a graph obtained from the power spectrum 220 with respect to the second image.

As shown in FIG. 2, the first spectral envelope 211 and the second spectral envelope 221 have different inclinations in the graphs. In other words, the first spectral envelope 211 has a gentle inclination, whereas the second spectral envelope 221 includes a period having a flat inclination and a period having a suddenly-changing inclination. The spectral envelope value is a peak value usually when the bin index value has an intermediate value. For example, when the value of the spectral envelope changes from a value of 70% of the peak value to the peak value when the bin index value changes by 100, the inclination can be a suddenly-changing inclination. When the same spectral envelope value changes when the bin index value changes by 200, the inclination can be a gentle inclination.

In an embodiment, the video quality assessment apparatus 130 may estimate a blur level of an image of each sub-area by using the spectral envelope.

Statistically, there is a blurred area in an image when the inclination of the spectral envelope has the suddenly-changing period. Thus, the video quality assessment apparatus 130 may estimate the blur level by using the inclination of the spectral envelope.

In an embodiment, the video quality assessment apparatus 130 may estimate that a blur level of the first image is 0 based on the fact that there is no point where the inclination of the first spectral envelope 211 rapidly changes.

In an embodiment, the video quality assessment apparatus 130 may identify a location where an inclination of a spectral envelope exceeds a threshold. For example, the video quality assessment apparatus 130 may obtain a bin index value 223 of a point based on the fact that there is the point where the inclination of the second spectral envelope 221 suddenly changes more than a certain reference value, and may estimate a blur level of the second image from the obtained bin index value 223.

For example, the video quality assessment apparatus 130 may estimate the blur level of the second image according to an inclination value of the graph in the period where the inclination of the second spectral envelope 221 suddenly changes.

For example, the video quality assessment apparatus 130 may estimate the blur level according to a ratio between the period where the inclination of the second spectral envelope 221 is gentle and the period where the inclination of the second spectral envelope 221 suddenly changes.

In an embodiment, the video quality assessment apparatus 130 may divide an input frame into a plurality of sub-areas, obtain a spectral envelope for each sub-area, and estimate a blur level of each sub-area, by using a graph shape of the spectral envelope corresponding to each sub-area.

Figure 3:
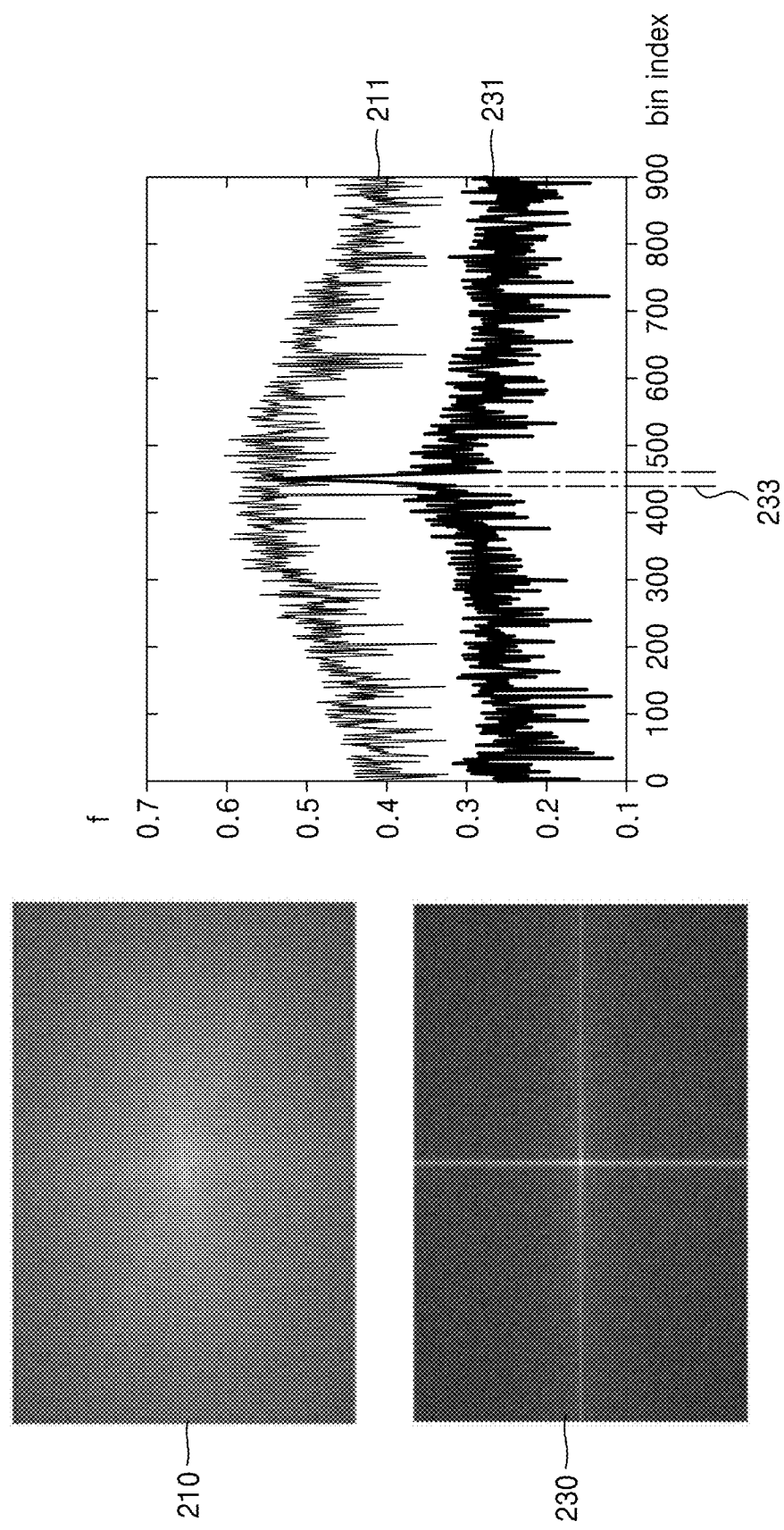
FIG. 3 is a diagram illustrating power spectra and spectral envelopes from an input frame, according to an embodiment.

FIG. 3 is a diagram of power spectra 210 and 230, and spectral envelopes 211 and 231 obtained from different input frames, according to an embodiment.

In FIG. 3, the power spectrum 210 of a first image and the power spectrum 230 of a third image are shown on the left side, and the graph on the right side shows the spectral envelopes 211 and 231 respectively obtained from the power spectra 210 and 230.

In the power spectra 210 and 230 shown in the left side of FIG. 3, the power spectrum 210 is obtained with respect to the clear first image as shown in FIG. 2, and the power spectrum 230 is obtained with respect to the third image that is less clear than a second image.

In the same manner as in FIG. 2, it may be seen that the power spectrum 210 obtained with respect to the first image is different than the power spectrum 230 obtained with respect to the third image. It may be seen that in the power spectrum 210 obtained with respect to the first image, a power value does not suddenly change and is filled smoothly in an entire area. By contrast, in the power spectrum 230 obtained with respect to the third image, a power component concentrates on a specific area with respect to the center of the power spectrum 230. Also, it may be seen that the power spectrum 230 obtained with respect to the third image has a higher concentration based on the center than the power spectrum 220 obtained with respect to the second image. A high concentration of a power spectrum may indicate a power value suddenly changing over the image.

The spectral envelops 211 and 231 are shown in the right side of FIG. 3. In a right graph of FIG. 3, the x axis indicates a bin index value, and the y axis indicates a frequency. The first spectral envelope 211 is obtained from the power spectrum 210 of the first image, and the third spectral envelope 231 is obtained from the power spectrum 230 of the third image. It may be seen that the first spectral envelope 211 has a gentle inclination, whereas the third spectral envelope 231 includes a period having a flat inclination and a period having a suddenly-changing inclination. Also, it may be seen that the third spectral envelope 231 has a very steeply changing inclination of the graph compared with the first spectral envelope 211, and has a further suddenly changing inclination compared to the second spectral envelope 221 shown in FIG. 2. For example, when the bin index value changes by 50, the slope of the graph can be a very steeply changing inclination when the value of the spectral envelope changes from a value of 70% of the peak value to the peak value.

In an embodiment, the video quality assessment apparatus 130 may estimate a blur level of an image of each sub-area by using a degree to which the inclination of the spectral envelope is steep. The video quality assessment apparatus 130 may determine that the greater the steepness of the inclination of the spectral envelope, the greater the blur level of the corresponding image.

In an embodiment, the video quality assessment apparatus 130 may obtain a bin index value 233 of a point where the inclination of the spectral envelope starts to suddenly change, and may estimate the blur level from the obtained bin index value 233. For example, the video quality assessment apparatus 130 may determine that the greater the bin index value of the point where the inclination of the spectral envelope starts to suddenly change, the greater the blur level of the corresponding image. The video quality assessment apparatus 130 may determine that the blur level of the third image is higher than that of the second image, by using the fact that the bin index value 233 of the point where the inclination of the third spectral envelope 221 of FIG. 3 suddenly changes is greater than the bin index value 223 of the point where the inclination of the second spectral envelope 231 of FIG. 2 suddenly changes.

As such, the video quality assessment apparatus 130 may estimate the blur level by using the spectral envelope in a frequency domain. The video quality assessment apparatus 130 may estimate the blur level of the image by using the inclination value of the spectral envelope, a ratio between a period where the inclination of the spectral envelope is gentle and a period where the inclination of the spectral envelope suddenly changes, or the bin index value at the point where the inclination of the spectral envelope starts to suddenly change.

As such, because the video quality assessment apparatus 130 calculates the blur level of the image, based on a rule or statistics, in the frequency domain, the video quality assessment apparatus 130 may estimate the blur level of the image with a small number of calculations and at a high speed.

Figure 4:
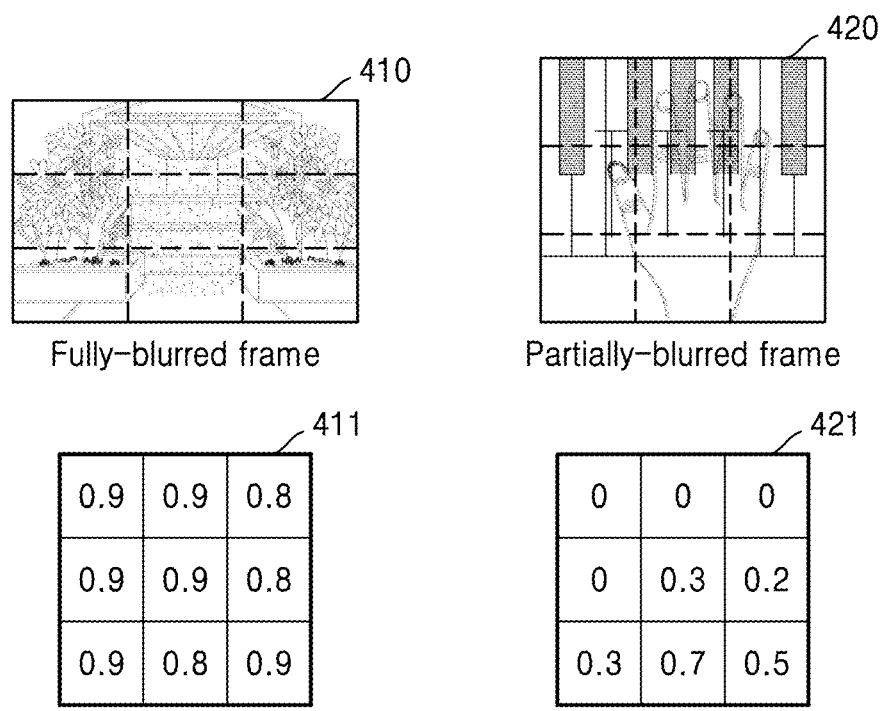
FIG. 4 is a diagram illustrating a fully-blurred frame and a partially-blurred frame, according to an embodiment.

FIG. 4 is a diagram illustrating a fully-blurred frame and a partially-blurred frame, according to an embodiment.

Referring to FIG. 4, the video quality assessment apparatus 130 may receive a plurality of frames included in a video and divide each frame into a plurality of sub-areas.

Each sub-area may be an area including a certain number of pixels. The number of sub-areas or the size of each sub-area may be previously set by a user or the video quality assessment apparatus 130, or may be changed by the user or the video quality assessment apparatus 130 in accordance with a frame. The user or the video quality assessment apparatus 130 may adjust the number of sub-areas or the size of each sub-area for each frame so that the frame is divided into more or fewer sub-areas.

The video quality assessment apparatus 130 may estimate a blur level with respect to each of the plurality of sub-areas. The video quality assessment apparatus 130 may identify a type of the frame based on the estimated blur level of each sub-area.

In an embodiment, the video quality assessment apparatus 130 may determine that there is no blur in a corresponding frame when the number of sub-areas in which a value of a blur level of each sub-area is equal to or greater than a certain value is equal to or less than a first certain number. In this case, the video quality assessment apparatus 130 may highly assess a quality score with respect to the corresponding frame.

In an embodiment, the video quality assessment apparatus 130 may identify whether the corresponding frame is a fully-blurred frame or a partially-blurred frame when the number of sub-areas in which the value of the blur level of each sub-area is equal to or greater than the certain value exceeds the first certain number.

In an embodiment, the fully-blurred frame may indicate a frame including a blur level is equal to or greater than a certain reference value throughout the frame. The video quality assessment apparatus 130 may identify a frame in which sub-areas equal to or more than a second certain number among the plurality of sub-areas included in the frame have a blur level equal to or higher than the certain reference value as the fully-blurred frame.

The partially-blurred frame may indicate a frame in which the number of sub-areas which have a blur level equal to or higher than the certain reference value is greater than the first certain number and less than the second certain number among the plurality of sub-areas included in the frame.

In FIG. 4, when a first frame 410 is input, the video quality assessment apparatus 130 may divide the first frame 410 into a certain number, for example, nine sub-areas, and estimate a blur level for each sub-area. In FIG. 4, a first table 411 indicates a blur level obtained by the video quality assessment apparatus 130 for each sub-area of the first frame 410.

The video quality assessment apparatus 130 may identify the number of sub-areas in which a value of the blur level of each sub-area exceeds the certain reference value. For example, the blur level may be a value between 0 and 1. For example, the video quality assessment apparatus 130 may identify a sub-area having a blur level equal to or greater than the certain value, for example, 0.3. In this example, all nine sub-areas have a blur level that is equal to or greater than 0.3. The video quality assessment apparatus 130 may identify the first frame 410 as the fully-blurred frame in correspondence to the number of sub-areas having the blur level equal to or greater than 0.3 exceeding a certain number, for example, 80% of the total number of sub-areas.

Similarly, when a second frame 420 is input, the video quality assessment apparatus 130 may divide the second frame 420 into sub-areas and estimate a blur level for each sub-area. In FIG. 4, a second table 421 indicates a blur level obtained by the video quality assessment apparatus 130 for each sub-area of the second frame 420. The video quality assessment apparatus 130 may identify the number of sub-areas in which the value of the blur level of each sub-area is equal to or higher than the certain value, for example, 0.3. In this example, all four sub-areas have a blur level that is equal to or greater than 0.3. The video quality assessment apparatus 130 may identify the second frame 420 as the partially-blurred frame in correspondence to the number of sub-areas having the blur level equal to or higher than 0.3 exceeding a certain percent, for example, 30%, and not exceeding 80%.

As described above, according to an embodiment, the video quality assessment apparatus 130 may determine whether an input frame is a non-blurred frame, the fully-blurred frame, or the partially-blurred frame based on blur levels of a plurality of sub-areas included in the input frame.

Figure 5:
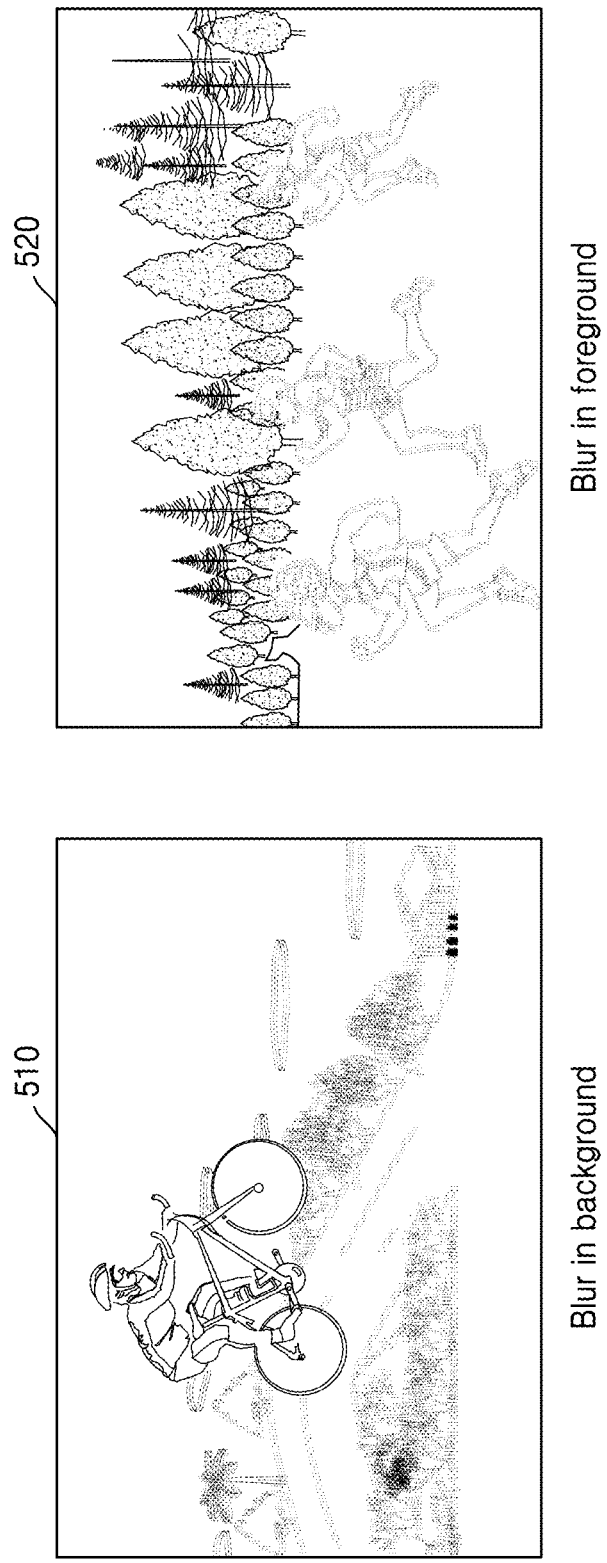
FIG. 5 is a diagram illustrating importance information for each sub-area included in a frame, according to an embodiment.

FIG. 5 is a diagram illustrating importance information for each sub-area included in a frame, according to an embodiment.

In an embodiment, the video quality assessment apparatus 130 does not uniformly assess a quality of an entire frame, but may assess the quality of the entire frame using a feature of each sub-area of the frame. That is, the video quality assessment apparatus 130 may more accurately assess the quality of the frame by reflecting the feature of each sub-area. To this end, in an embodiment, the video quality assessment apparatus 130 may obtain importance information for each sub-area of the frame.

The importance information is information related to a factor that may affect a quality score, and may be obtained from the entire frame, from each sub-area included in the frame, or in consideration of the entire frame and the sub-area.

In general, when a human recognizes a blur in an image, even when a blur level is the same, a human does not recognize the blur equally in all images, and tend to perceive a degree of the blur differently according to various elements of each image. In an embodiment, the video quality assessment apparatus 130 may consider an element that affects the recognition of the blur as the importance information.

The importance information may include information about whether an object with the blur in the frame is a foreground or a background.

Referring to FIG. 5, in frame 510 of FIG. 5, a forest is the background and is located at the rear of an image, and a human who rides a bicycle is the foreground and is located at the front of the image. The forest, that is the background, has a high degree of blur, and the human who rides the bicycle, that is the foreground, has a low degree of blur.

In frame 520 of FIG. 5, a forest is the background and is located at the rear of an image, and humans who are moving are that are the foreground and are located at the front of the image. Unlike the frame 510, it may be seen that in the frame 520, the forest that is the background has a low degree of blur, and the moving humans have a higher degree of blur.

A human tends to perceive a degree of blurring of an object in the foreground to be larger than that of an object in the background. That is, in FIG. 5, a human perceives that the frame 520 having a large degree of blur of the foreground object is more distorted than the frame 510 having a large degree of blur of the object in the background.

In an embodiment, the video quality assessment apparatus 130 may consider different characteristics for each sub-area by assigning greater importance information to the foreground and lower importance information to the background.

Figure 6:
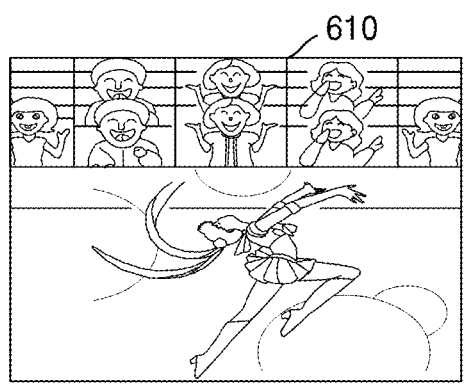
FIG. 6 is a diagram illustrating information obtained for each sub-area included in a frame according to an embodiment.
Figure 6:
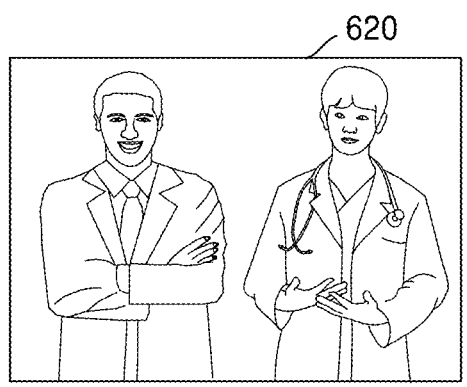

FIG. 6 is a diagram illustrating importance information for each sub-area included in a frame according to an embodiment.

A human perceives a degree of blur differently according to various elements of an image, and the element may include information about a genre to which the frame belongs. In other words, a human tends to perceive the degree of blur differently according to what genre the frame belongs to.

Referring to FIG. 6, a frame 610 shows an image that has a lot of movements and requires concentration on the movements, and may correspond to, for example, a sports genre. A frame 620 shows an image that has little movement and does not give a significant meaning to the movement, and may corresponding to, for example, a genre such as a drama or a lecture. A human perceives a larger blur in the frame 610 that has a lot of movements and requires concentration on the movements than in the frame 620 that has little movement. This perception of a human may influence a quality score.

In addition, a human may have different degrees of perception of blur according to a position of the object in the frame. For example, because a human tends to see more a center part of a screen than an edge part when viewing a video, a human perceives the degree of blur differently in a frame with a blur in the center part and a frame with a blur in the edge part.

In addition, a human tends to view an image in consideration of semantic information of an object included in a frame. This indicates that a degree of perception of the blur of the object may vary according to what object is included in the frame, that is, the meaning of the object in the frame. For example, when the video is an image of a sports event such as the frame 610 of FIG. 6, the importance information recognized by a human watching the video may vary according to whether the object included in the frame is a sports player or an audience. For example, a human perceives a blur in a frame including the blur in a sports player's face than in a frame including the blur in an audience's face.

As such, the importance information related to a factor that may affect the quality score may include at least one of information about whether the object included in the frame is the foreground or the background, information about the genre to which the frame belongs, the semantic information, or location information.

As described above, the video quality assessment apparatus 130 according to an embodiment may more accurately assess the quality of the frame by reflecting a perceptual characteristic of a human of recognizing the blur.

In addition, the video quality assessment apparatus 130 according to the embodiment does not uniformly assess the quality of an entire frame but may obtain the importance information for each sub-area and use the importance information for quality assessment, thereby assessing the quality of the frame in consideration of the characteristic for each sub-area.

Figure 7:
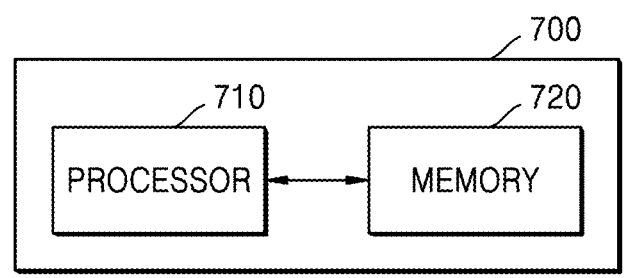
FIG. 7 is a block diagram of an internal structure of a computing apparatus, according to an embodiment.

FIG. 7 is a block diagram of an internal structure of a computing apparatus 700, according to an embodiment.

Referring to FIG. 2, the computing apparatus 700 may include a processor 710 and a memory 720. The computing apparatus 700 of FIG. 7 may be an example of the video quality assessment apparatus 130 shown in FIG. 1.

The memory 720 according to an embodiment may store one or more instructions. The one or more instructions may contain a code made by a compiler or a code executable by an interpreter. The memory 720 may store one or more programs executed by the processor 710. The memory 720 may store at least one neural network and/or a predefined operation rule or an AI model. The memory 720 may also store data that is input to the computing apparatus 700 or output by the computing apparatus 700.

The memory 720 may be non-transitory, and may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, or an optical disk.

The processor 710 controls the overall operation of the computing apparatus 700. The processor 710 may control the computing apparatus 700 to function, by executing the one or more instructions stored in the memory 720.

In an embodiment, the processor 710 may divide each frame included in the input video into a plurality of sub-areas, and obtain a spectral envelope with respect to each sub-area. The processor 710 may estimate the blur level for each sub-area using the spectral envelope, and based on this, may identify whether the frame is a frame without blur, a fully-blurred frame, or a partially-blurred frame.

In an embodiment, the processor 710 may obtain a spectral envelope distribution feature from a spectral envelope obtained for each sub-area. The spectral envelope distribution feature may be a statistical property of a distribution of a spectral envelope graph.

In an embodiment, an analysis-based quality score may be a score reflecting a statistical property of a frequency characteristic of a frame.

In an embodiment, when it is determined that the frame is a fully-blurred frame, the processor 710 may analyze a spectral envelope distribution feature obtained for each of a plurality of sub-areas included in the fully-blurred frame, and obtain an analysis-based quality score with respect to the fully-blurred frame.

In an embodiment, when it is determined that an input frame is a partially-blurred frame, the processor 710 may obtain a model-based quality score with respect to the partially-blurred frame.

In an embodiment, the model-based quality score may indicate a quality score obtained with respect to the partially-blurred frame using at least one neural network.

To obtain the model-based quality score, the processor 710 may use the at least one neural network.

A neural network may receive data, perform an operation for analysis and classification, and output result data. In order for the neural network to accurately output the result data corresponding to input data, it is necessary to train the neural network. Here, 'training' may indicate training a neural network so that the neural network may discover or master by itself a method of inputting various data into the neural network and analyzing the input data, a method of classifying the input data, and/or a method of extracting features necessary for generating result data from the input data. Training the neural network indicates that an AI model having intended characteristic is generated by applying a learning algorithm to a plurality of pieces of training data. Such learning may be performed in the computing apparatus 700 itself on which AI is performed, or may be performed through a separate server/system.

Here, the learning algorithm is a method of training a certain target device (e.g., a robot) using the plurality of pieces of training data and allowing the certain target device to make a decision or make a prediction by itself. Examples of learning algorithms include supervised learning, unsupervised learning, semi-supervised learning, or reinforcement learning, and the learning algorithm in the embodiment is not limited to the above example except where specified.

A set of algorithms to output data corresponding to input data through the neural network, software that executes the set of algorithms, and/or hardware that executes the set of algorithms may be called an 'AI model' (or an 'artificial intelligence model').

The processor 710 may process input data according to a predefined operation rule or an AI model. The predefined operation rule or the AI model may be created using a specific algorithm. In addition, the AI model may be trained with the specific algorithm. The processor 710 may generate output data corresponding to the input data through the AI model.

The processor 710 may store at least one AI model. The processor 710 may generate output data from an input image by using a plurality of AI models.

In an embodiment, the processor 710 may obtain importance information from a partially-blurred frame using at least one neural network.

In an embodiment, the processor 710 may calculate a weight for each sub-area by using the importance information and a spectral envelope distribution feature which is a frequency characteristic for each sub-area, together. The weight may indicate a characteristic of each sub-area in quality assessment.

The processor 710 may generate a weight matrix with respect to the entire partially-blurred frame by using the weight for each sub-area.

In an embodiment, the processor 710 may obtain a model-based quality score with respect to the partially-blurred frame from the weight matrix and the partially-blurred frame by using at least one neural network.

As described above, in an embodiment, the processor 710 may obtain an analysis-based quality score with respect to the fully-blurred frame by analyzing a frequency characteristic with respect to the fully-blurred frame, and may obtain the model-based quality score by using at least one neural network with respect to the partially-blurred frame.

Figure 8:
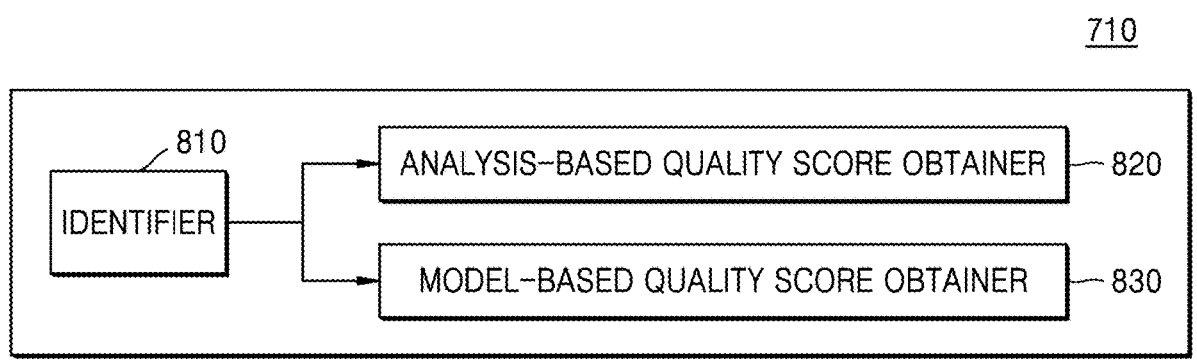
FIG. 8 is a block diagram illustrating a configuration of a processor, according to an embodiment.

FIG. 8 is a block diagram illustrating a configuration of the processor 710 of FIG. 7 in more detail, according to an embodiment.

Referring to FIG. 8, the processor 710 may include an identifier 810, an analysis-based quality score obtainer 820, and a model-based quality score obtainer 830 according to a function to be performed.

The identifier 810 may divide an input frame into sub-areas and convert each sub-area into a signal of a frequency domain. The identifier 810 may obtain a power spectrum from the signal of the frequency domain and obtain a spectral envelope from the power spectrum.

The identifier 810 may estimate a blur level for each sub-area by using the spectral envelope. The identifier 810 may identify whether the input frame is a frame without blur, a partially-blurred frame, or a fully-blurred frame, according to the number of sub-areas having a blur level equal to or greater than a certain reference value.

In addition, the identifier 810 may obtain a spectral envelope distribution feature representing a statistical property of a spectral envelope graph from the spectral envelope for each sub-area of the input frame.

When the frame identified by the identifier 810 is the frame without blur, the frame without blur may bypass both the analysis-based quality score obtainer 820 and the model-based quality score obtainer 830. Also, image quality processing may not be performed on the frame without blur. That is, the frame without blur may be output without image quality improvement.

When the frame identified by the identifier 810 is the fully-blurred frame, the fully-blurred frame is input to the analysis-based quality score obtainer 820.

The analysis-based quality score obtainer 820 may receive the spectral envelope distribution feature of the fully-blurred frame from the identifier 810 and analyze the spectral envelope distribution feature. The analysis-based quality score obtainer 820 may analyze the spectral envelope distribution feature to obtain a quality score with respect to the fully-blurred frame.

When the frame identified by the identifier 810 is the partially-blurred frame, the partially-blurred frame is input to the model-based quality score obtainer 830.

The model-based quality score obtainer 830 may obtain a model-based quality score from the input partially-blurred frame.

The model-based quality score obtainer 830 may obtain importance information for each sub-area included in the partially-blurred frame using at least one neural network. The model-based quality score obtainer 830 may obtain a weight for each sub-area using a spectral envelope distribution feature for each sub-area of a partial frame obtained by the identifier 810 and importance information for each sub-area of a partial frame obtained using a neural network. The model-based quality score obtainer 830 may generate a weight matrix with respect to the entire partially-blurred frame using the weight for each sub-area.

The model-based quality score obtainer 830 may obtain a final score of the partially-blurred frame from the weight matrix and the partially-blurred frame using at least one neural network. That is, the model-based quality score obtainer 830 may obtain a feature vector from the partially-blurred frame using at least one neural network and obtain a weighted feature by considering the feature vector and the weight matrix together. The model-based quality score obtainer 830 may obtain a quality assessment score for the entire partially-blurred frame from the weighted feature.

The quality score with respect to the fully-blurred frame obtained by the analysis-based quality score obtainer 820 and the quality score with respect to the partially-blurred frame obtained by the model-based quality score obtainer 830 may be used when quality is reconstructed in units of frames or processing is necessary.

In an embodiment, the processor 710 may process quality of a video including a frame by using at least one of the analysis-based quality score or the model-based quality score.

For example, the processor 710 may process each frame to improve the quality thereof by using the score obtained for each frame. For example, the processor 710 may transmit the score obtained for each frame to the image display apparatus 110 so that the image display apparatus 110 processes the quality for each frame.

Figure 9:
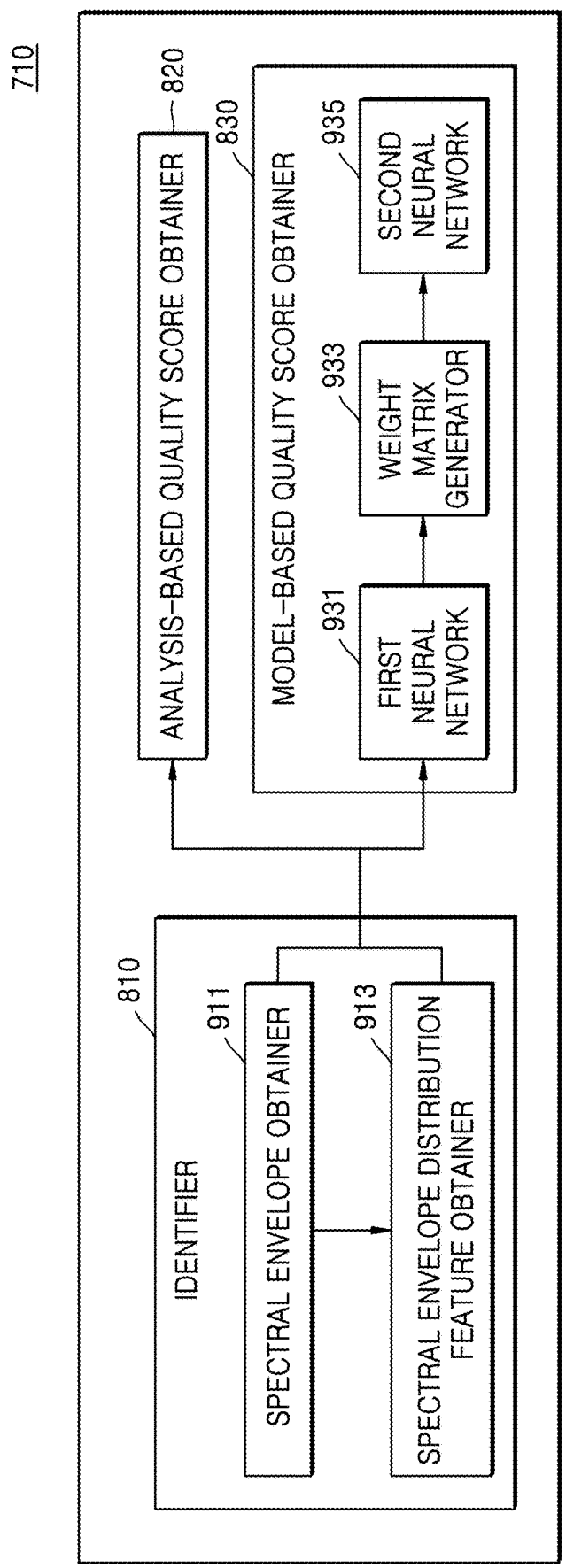
FIG. 9 is a block diagram illustrating a configuration of a processor, according to an embodiment.

FIG. 9 is a block diagram illustrating a configuration of the processor 710 of FIG. 7 in more detail, according to an embodiment. The processor 710 of FIG. 9 may include an identifier 810, an analysis-based quality score obtainer 820, and a model-based quality score obtainer 830 included in the processor 710 of FIG. 8. Hereinafter, descriptions redundant with those given in FIG. 8 will be omitted.

Referring to FIG. 9, the identifier 810 may include a spectral envelope obtainer 911 and a spectral envelope distribution feature obtainer 913.

The spectral envelope obtainer 911 may divide an input frame into sub-areas and perform Fourier transform on each sub-area to obtain a signal in a frequency domain. The spectral envelope obtainer 911 may obtain a power spectrum of the signal in the frequency domain and obtain a spectral envelope from the power spectrum.

The spectral envelope obtainer 911 may estimate a blur level for each sub-area by using the spectral envelope. For example, the spectral envelope obtainer 911 may estimate the blur level for each sub-area by using an inclination value of the spectral envelope. For example, the spectral envelope obtainer 911 may estimate the blur level according to a ratio of a period where the inclination of the spectral envelope is gentle and a period where the inclination rapidly changes. For example, the spectral envelope obtainer 911 may estimate the blur level from a bin index value at a point where the inclination of the spectral envelope rapidly changes.

The spectral envelope distribution feature obtainer 913 may obtain a spectral envelope distribution feature from the spectral envelope for each sub-area obtained by the spectral envelope obtainer 911.

The spectral envelope distribution feature represents a statistical property of a distribution of a spectral envelope graph, and the statistical property of the graph distribution may include at least one of a mode, a median, an arithmetic mean, a harmonic mean, a geometric mean, a global minimum, a global maximum, a range, a variance or a deviation.

The spectral envelope distribution feature obtainer 913 may obtain a spectral envelope distribution feature for each frame in both cases where the frame is a fully-blurred frame and a partially-blurred frame.

The spectral envelope distribution feature obtainer 913 may obtain a spectral envelope distribution feature of the fully-blurred frame and send the spectral envelope distribution feature to the analysis-based quality score obtainer 820. In addition, the spectral envelope distribution feature obtainer 913 may obtain a spectral envelope distribution feature of the partially-blurred frame and send the spectral envelope distribution feature to the model-based quality score obtainer 830.

The analysis-based quality score obtainer 820 may receive the spectral envelope distribution feature obtained for each sub-area included in the fully-blurred frame from the spectral envelope distribution feature obtainer 913 and analyze the spectral envelope distribution feature. The spectral envelope distribution feature with respect to the fully-blurred frame may be a statistical property of a spectral envelope graph obtained for each sub-area included in the fully-blurred frame.

The analysis-based quality score obtainer 820 may analyze a statistical property of the spectral envelope graph and obtain a quality score with respect to the fully-blurred frame from the statistical property.

The model-based quality score obtainer 830 may include a first neural network 931, a weight matrix generator 933, and a second neural network 935.

In an embodiment, the first neural network 931 may be a model trained to analyze and classify input data to extract importance information which is a feature that affects video quality assessment from the input data.

The first neural network 931 may be an algorithm extracting features from input data, or a set of algorithms, software executing the set of algorithms, and/or hardware executing the set of algorithms.

The first neural network 931 may be a deep neural network (DNN) including two or more hidden layers. The first neural network 931 may include a structure in which input data is processed by passing through hidden layers such that the processed data is output. Each layer of the first neural network 931 is represented by one or more nodes, and nodes between layers are connected by edges.

The first neural network 931 may obtain importance information for each sub-area included in an input partially-blurred frame.

The importance information may include at least one of information about whether an object included in the frame is a foreground or a background, information about a genre to which the frame belongs, semantic information, or location information of the sub-area.

The first neural network may obtain the importance information from the entire partially-blurred frame or each sub-area, or by considering the entire partially-blurred frame and the sub-area together. For example, the first neural network 931 may obtain information about a genre to which the frame belongs from the entire partially-blurred frame. For example, the first neural network 931 may obtain a coordinate value indicating a location of each sub-area included in the frame. For example, the first neural network 931 may obtain semantic information of an object included in the frame by considering the entire frame and the sub-area together.

The weight matrix generator 933 may receive importance information from the first neural network 931 and receive a spectral envelope distribution feature of the partially-blurred frame from the spectral envelope distribution feature obtainer 913.

The weight matrix generator 933 may obtain a weight for each sub-area by using the importance information for each sub-area and the spectral envelope distribution feature. In an embodiment, the weight matrix generator 933 may obtain the weight for each sub-area by multiplying the importance information and the spectral envelope distribution feature.

The weight may be information indicating a characteristic of each sub-area. Because both the importance information and the spectral envelope distribution feature are obtained from content of the frame, the weight generated using the importance information and the spectral envelope distribution feature may also vary according to the content included in the frame.

The weight matrix generator 933 may generate a weight matrix with respect to the entire partially-blurred frame using the weight for each sub-area.

In an embodiment, the weight matrix generator 933 may correct the weight of the sub-area in consideration of importance information of one or more neighboring sub-areas and the spectral envelope distribution feature.

The weight matrix generator 933 may correct the spectral envelope distribution feature of the sub-area to be more natural by using the spectral envelope distribution feature of one or more adjacent sub-areas. For example, the weight matrix generator 933 may correct a spectral envelope distribution feature of a first sub-area by using at least one adjacent sub-area located in one or more adjacent sub-areas neighboring the first sub-area, i.e., right, left, upper, and lower sides of the first sub-area, with respect to the first sub-area included in the partially-blurred frame.

The weight matrix generator 933 may correct the spectral envelope distribution feature of the first sub-area by considering the adjacent sub-areas and the first sub-area together. For example, the weight matrix generator 933 may correct the spectral envelope distribution feature of the first sub-area by using an average of spectral envelope distribution feature values of the first sub-area and the adjacent sub-areas.

Similarly, the weight matrix generator 933 may correct importance information of the first sub-area with importance information of the adjacent sub-areas by considering importance information of at least one adjacent sub-area neighboring the first sub-area.

The weight matrix generator 933 may obtain a weight value with respect to the first sub-area by using the spectral envelope distribution feature and importance information corrected with reference to the neighboring sub-areas, and generate a weight matrix therefrom.

The weight matrix is input to the second neural network 935.

Because a multidimensional feature vector is complex, various characteristics of the partially-blurred frame may not be considered only using a statistical analysis method. Accordingly, in an embodiment, the model-based quality score obtainer 830 may obtain a final score with respect to the partially-blurred frame by considering various characteristics of each sub-area using the second neural network 935.

The second neural network 935 may be an algorithm trained to analyze and classify input data to extract features of the input data and obtain the quality score from the features, a set of algorithms, software that executes the set of algorithms, and/or hardware that executes the set of algorithms.

The second neural network 935 may be a regression model. The regression model is an analysis method of obtaining a model between variables with respect to continuous variables and then measuring a fit. The second neural network 935 may be one of a support vector machine (SVM) regression, a random forest regression, or a deep-neural network, but is not limited thereto.

The second neural network 935 may be a previously trained model for video quality assessment. The second neural network 935 may learn mean opinion scores (MOS). MOS is obtained through subjective assessment of a human, and may indicate an average value of individual parameters with respect to video quality assessed by humans. The second neural network 935 may train by previously learning a correlation between a feature vector and the MOS.

The trained second neural network 935 may receive the partially-blurred frame and obtain the feature vector representing various features related to the quality of the partially-blurred frame from the partially-blurred frame. Features related to the quality may include at least one of a blur-related feature, a motion-related feature, a content-related feature, a perceptual feature, a spatial feature, a deep feature for each layer extracted from a plurality of hidden layers, or features that are statistically extracted from a lower level to an upper level. The second neural network 935 may obtain the feature vector representing the above features before a final output operation.

The second neural network 935 may receive the weight matrix along with the partially-blurred frame. The second neural network 935 may obtain a feature to which the weight is reflected by considering the obtained features and the weight matrix together.

The second neural network 935 may obtain the feature vector in which the weight is considered from the input partially-blurred frame, and output an objective quality score that closely matches a subjective score of a human.

As described above, according to an embodiment, the model-based quality score obtainer 830 may obtain a feature in which a weight is reflected from the partially-blurred frame using the second neural network 935 that has learned the MOS, and obtain a quality score similar to a subjective assessment result of a human from the feature.

Figure 10:
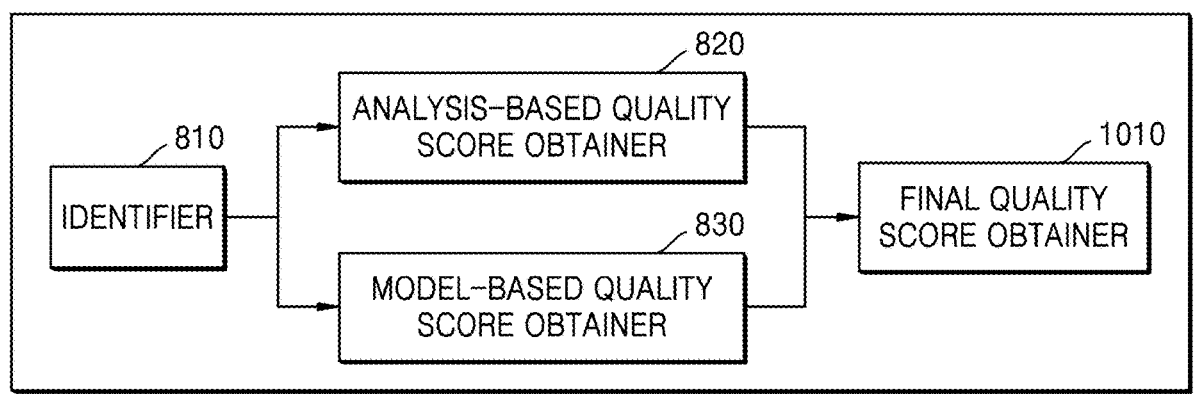
FIG. 10 is a block diagram of an internal structure of a processor, according to an embodiment.

FIG. 10 is a block diagram of an internal structure of the processor 710 of FIG. 7, according to an embodiment.

Referring to FIG. 10, the processor 710 may further include a final quality score obtainer 1010, in addition to the identifier 810, the analysis-based quality score obtainer 820, and the model-based quality score obtainer 830 included in the processor 710 shown in FIG. 8. Hereinafter, descriptions redundant with those given in FIG. 8 will be omitted.

The final quality score obtainer 1010 may receive a quality score with respect to a fully-blurred frame from the analysis-based quality score obtainer 820 and receive a quality score with respect to a partially-blurred frame from the model-based quality score obtainer 830.

The final quality score obtainer 1010 may accumulate scores with respect to individual frames together with a time stamp of each frame. The final quality score obtainer 1010 may accumulate scores for each frame received for a certain period of time to obtain time-series data.

The final quality score obtainer 1010 may consider a temporal influence or a temporal dependence related to recognizing a video by using the quality scores of frames accumulated over time.

For example, humans tend to continue to assess a video with poor initial quality even if the quality of the video subsequently improves. For example, humans tend to perceive that quality of successive frames is worse when frames of poor quality are successively output than when individually assessing the frames of poor quality. For example, humans tend to perceive that a blur level is higher in a video of a lower frames per second (fps) than a video of a higher fps when the video has the same blur level.

The final quality score obtainer 1010 may consider this temporal effect when calculating the final quality score.

The final quality score obtainer 1010 may obtain the final quality score with respect to the entire video by smoothing the time-series data. For example, the final quality score obtainer 1010 may use a simple heuristic rule or a complex model to smooth the time-series data.

In an embodiment, when the final quality score obtainer 1010 obtains the final quality score by using a model, the final quality score obtainer 1010 may use at least one neural network. For convenience of explanation, the neural network used by the final quality score obtainer 1010 is referred to as a third neural network.

The third neural network may be an algorithm trained to analyze and classify accumulated input data to extract time-series features of the input data and obtain the final quality score from the time-series features, a set of algorithms, software that executes the set of algorithms, and/or hardware that executes the set of algorithms.

In an embodiment, the final quality score obtainer 1010 may use long short-term memory (LSTM) models as the third neural network. LSTM is a kind of recurrent neural networks (RNNs) that may learn long-term dependency between time steps of sequence data. The LSTM may receive sequence or time-series data and learn the long-term dependency between time steps of the sequence data.

The final quality score obtainer 1010 may receive the features accumulated through the third neural network, and may obtain the final quality score with respect to the entire video in consideration of an effect over time.

As described above, according to an embodiment, the video quality assessment apparatus 130 may accumulate scores obtained with respect to each of the fully-blurred frame and the partially-blurred frame to obtain and smooth the time-series data, and obtain the final quality score with respect to the entire video.

Figure 11:
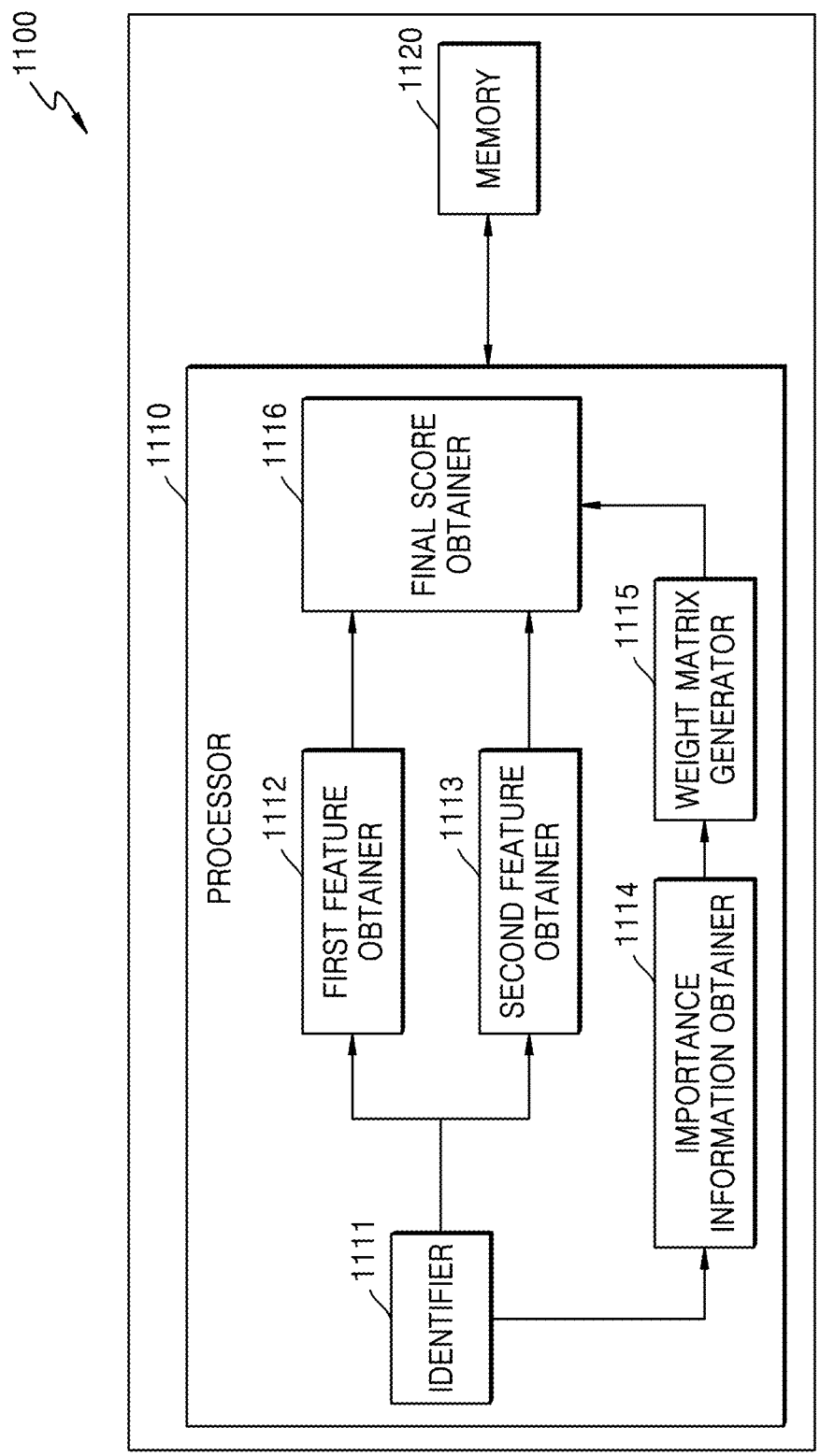
FIG. 11 is a block diagram of an internal structure of a computing apparatus, according to another embodiment.

FIG. 11 is a block diagram of an internal structure of a computing apparatus 1100, according to another embodiment.

The computing apparatus 1100 of FIG. 11 may be an example of the video quality assessment apparatus 130 shown in FIG. 1. Referring to FIG. 11, the computing apparatus 1100 may include a processor 1110 and a memory 1120.

The memory 1120 according to the embodiment may store at least one instruction. The at least one instruction may contain a code made by a compiler or a code executable by an interpreter. The memory 1120 may store at least one program executed by the processor 1110. At least one neural network and/or a predefined operation rule or AI model may be stored in the memory 1120. In addition, the memory 1120 may store data input to the computing apparatus 1100 or output from the computing apparatus 1100.

The processor 1110 controls the overall operation of the computing apparatus 1100. The processor 1110 may control the computing apparatus 1100 to function by executing one or more instructions stored in the memory 1120.

In FIG. 11, the processor 1110 may include an identifier 1111, a first feature obtainer 1112, a second feature obtainer 1113, an importance information obtainer 1114, a weight matrix generator 1115, and a final score obtainer 1116.

In an embodiment, the identifier 1111 may divide each frame included in an input video into a plurality of sub-areas and obtain a spectral envelope with respect to each sub-area. The identifier 1111 may estimate a blur level for each sub-area using the spectral envelope, and based on the blur level, may identify whether a frame is a frame without blur, a fully-blurred frame, or a partially-blurred frame.

In an embodiment, the identifier 1111 may obtain a spectral envelope distribution feature from the spectral envelope obtained for each sub-area.

The computing apparatus 1100 of FIG. 11 may obtain different features from the fully-blurred frame and the partially-blurred frame, and obtain a final quality of the entire video from at least one neural network by using the different features.

Unlike the computing apparatus 700 of FIG. 7 that obtains a score for each frame by using different methods for each frame type, the computing apparatus 1100 of FIG. 11 may obtain different features for each frame type, input different features into the neural network as input data and obtain the final score from the neural network.

In an embodiment, when it is determined that the frame is the fully-blurred frame, the identifier 1111 sends the fully-blurred frame to the first feature obtainer 1112, and when it is determined that the frame is the partially-blurred frame, sends the partially-blurred frame to the second feature obtainer 1113.

The first feature obtainer 1112 may obtain a first feature from the fully-blurred frame. In an embodiment, the first feature may be a spectral envelope distribution feature.

In an embodiment, the first feature obtainer 1112 may receive a spectral envelope distribution feature for each sub-area of the fully-blurred frame from the identifier 1111. In an embodiment, other than the identifier 1111, the first feature obtainer 1112 may obtain a spectral envelope distribution feature obtained with respect to each of a plurality of sub-areas included in the fully-blurred frame.

The spectral envelope distribution feature may be a statistical property of a distribution of a spectral envelope graph. The spectral envelope distribution feature represents a statistical property of a distribution of a spectral envelope graph, and may include at least one of a mode, a median, an arithmetic mean, a harmonic mean, a geometric mean, a global minimum, a global maximum, a range, a variance or a deviation.

The second feature obtainer 1113 may obtain a second feature from the partially-blurred frame. In an embodiment, the second feature may be a feature obtained from the partially-blurred frame using at least one neural network. The neural network used by the second feature obtainer 1113 may be an algorithm extracting features from input data, or a set of algorithms, software executing the set of algorithms, and/or hardware executing the set of algorithms.

The second feature obtainer 1113 may obtain a feature related to a quality of the partially-blurred frame. The second feature obtainer 1113 may extract at least one of a blur-related feature, a motion-related feature, a content-related feature, a perceptual feature, a spatial feature, a deep feature for each layer extracted from a plurality of hidden layers, or features that are statistically extracted from a lower level to an upper level from the partially-blurred frame using the neural network.

The importance information obtainer 1114 may obtain importance information from the input frame. The importance information obtainer 1114 may obtain importance information for each sub-area included in the frame by using the neural network trained to obtain importance information of a factor that may affect a video quality assessment from an input frame.

The neural network used by the importance information obtainer 1114 may be a model trained to extract a feature that affects a quality assessment by analyzing and classifying the input frame. The neural network used by the importance information obtainer 1114 may be a deep neural network (DNN) including two or more hidden layers.

The neural network used by the importance information obtainer 1114 that obtains the importance information from both the fully-blurred frame and the partially-blurred frame is distinguished from the first neural network 931 of FIG. 9 that obtains the importance information only from the partially-blurred frame. The neural network used by the importance information obtainer 1114 that performs a function of obtaining the importance information from the input frame may be the same as the first neural network 931.

The importance information obtainer 1114 may obtain the importance information for each sub-area from the entire frame or each sub-area or by considering the entire frame and the sub-area together. The importance information may include at least one of information about whether an object included in the frame is a foreground or a background, information about a genre to which the frame belongs, semantic information, or location information of the sub-area.

The weight matrix generator 1115 receives the importance information from the importance information obtainer 1114. Also, the weight matrix generator 1115 may receive a spectral envelope distribution feature for each sub-area of a frame input from the identifier 810.

The weight matrix generator 1115 may obtain a weight for each sub-area by using the importance information for each sub-area and the spectral envelope distribution feature. The weight matrix generator 1115 may generate a weight matrix for the entire frame by adding the weight for each sub-area.

The final score obtainer 1116 may receive a first feature with respect to the fully-blurred frame obtained from the first feature obtainer 1112 and a second feature with respect to the partially-blurred frame obtained from the second feature obtainer 1113. Because the final score obtainer 1116 receives the first feature the second feature, it is not necessary to separately obtain a feature from the input data.

The final score obtainer 1116 may receive the weight matrix generated by the weight matrix generator 1115 with respect to both the fully-blurred frame and the partially-blurred frame. The final score obtainer 1116 may receive the first feature, the second feature, the weight matrix, and the frame, and accumulate features with respect to individual frames together with a time stamp of each frame received for a certain period of time to obtain time-series data.

As described with reference to FIG. 10, the computing apparatus 700 may accumulate the score obtained for each frame received for a certain period of time to obtain the time-series data, but unlike this, the final score obtainer 1116 included in the computing apparatus 1100 of FIG. 11 may accumulate the feature obtained for each frame received for a certain period of time. The final score obtainer 1116 may obtain the time-series data by accumulating the first feature and the second feature for a certain period of time, and accumulating each frame and a weight matrix for each frame.

The final score obtainer 1116 may obtain a final quality score with respect to the entire video from the accumulated time-series data in consideration of an effect over time.

The final score obtainer 1116 may obtain the final quality score with respect to the entire video by smoothing the time-series data. For example, the final score obtainer 1116 may use a simple heuristic rule or a complex model to smooth the time-series data. In an embodiment, the final score obtainer 1116 may use long short-term memory (LSTM) models.

As described above, according to an embodiment, the computing apparatus 1100 may obtain different features from a frame according to the type of the input frame.

In addition, the computing apparatus 1100 may accumulate different features obtained for each frame received for a certain period of time and assess a quality of the entire video by using the different features.

Figure 12:
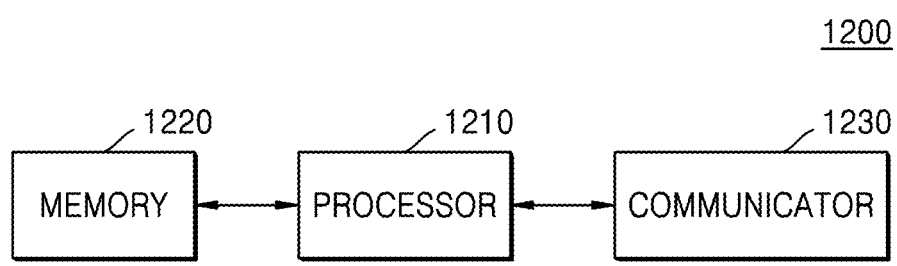
FIG. 12 is a block diagram of an internal structure of a computing apparatus, according to an embodiment.

FIG. 12 is a block diagram of an internal structure of a computing apparatus 1200, according to an embodiment. Referring to FIG. 12, the computing apparatus 1200 may include a communicator 1230 in addition to a processor 1210 and a memory 1220.

The computing apparatus 1200 of FIG. 12 may be an apparatus including the computing apparatus 700 of FIG. 7. Hereinafter, the processor 1210 and the memory 1220 included in the computing apparatus 1200 of FIG. 12 respectively have the same functions as the processor 710 and the memory 720 included in the computing apparatus 700 of FIG. 7, and thus redundant descriptions thereof are omitted.

The communicator 1230 according to the embodiment may transmit and receive signals by performing communication with an external apparatus connected over a wired or wireless network under the control by the processor 1210. The communicator 1230 may include at least one communication module such as a short-range communication module, a wired communication module, a mobile communication module, a broadcasting reception module, etc. The communication module may include a communication module capable of performing data transmission or reception through a network that follows a communication standard such as a tuner, Bluetooth, a wireless LAN (WLAN) (Wi-Fi), a wireless broadband (Wibro), World Interoperability for Microwave Access (Wimax), CDMA, or WCDMA.

In an embodiment, the communicator 1230 may transmit and receive data with an image display apparatus 110 that is external the computer apparatus 1200.

The communicator 1230 may receive a video from the image display apparatus 110. The processor 1210 may determine a blur level by dividing a frame input through the communicator 1230 into sub-areas and identify the input frame as a frame without blur, a fully-blurred frame and a partially-blurred frame, by executing one or more instructions stored in the memory 1220. The one or more instructions may contain a code made by a compiler or a code executable by an interpreter. The processor 1210 may obtain an analysis-based quality score with respect to the fully-blurred frame in correspondence to the input frame that is the fully-blurred frame, and obtain a model-based quality score with respect to the partially-blurred frame in correspondence to the input frame that is the partially-blurred frame.

The communicator 1230 may transmit the score obtained by the processor 1210 for each frame included in an input video to the image display apparatus 110.

In an embodiment, the processor 1210 may accumulate the analysis-based quality score and the model-based quality score obtained for each frame included in the input video for a certain period of time to obtain and smooth time-series data, and obtain a final quality score with respect to the video.

The communicator 1230 may transmit the final quality score with respect to the video obtained by the processor 1210 to the image display apparatus 110.

Figure 13:
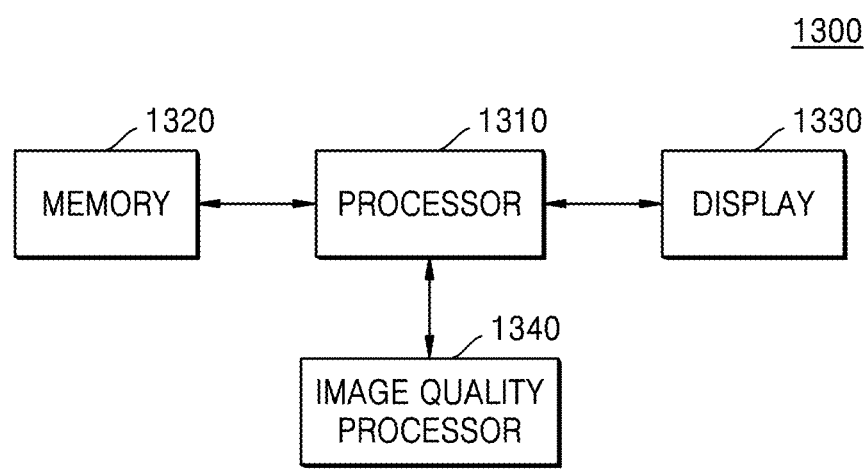
FIG. 13 is a block diagram of an internal structure of an image display apparatus, according to an embodiment

FIG. 13 is a block diagram of an internal structure of an image display apparatus 1300, according to an embodiment. Referring to FIG. 13, the image display apparatus 1300 may include a processor 1310, a memory 1320, a display 1330, and a quality processor 1340.

The image display apparatus 1300 of FIG. 13 may include the computing apparatus 700 of FIG. 7. That is, in an embodiment, the image display apparatus 1300 is not separated from the computing apparatus 700, but may include the computing apparatus 700 that performs a function of assessing a video quality.

Hereinafter, the processor 1310 and the memory 1320 included in the image display apparatus 1300 of FIG. 13 respectively have the same functions as the processor 710 and the memory 720 included in the computing apparatus 700 of FIG. 7, and thus redundant descriptions thereof are omitted.

The processor 1310 controls the overall operation of the image display apparatus 1300. The processor 1310 may measure the quality of a corresponding video before outputting a broadcast program received in real time or a program of a VOD service received by streaming or downloading on a screen.

The processor 1310 may identify whether an input frame is a frame without blur, a partially-blurred frame, or a fully-blurred frame according to a blur level of the input frame. When the input frame has no blur, the processor 1310 may output the input frame through the display 1330.

When the input frame is the fully-blurred frame, the processor 1310 may obtain an analysis-based quality score with respect to the fully-blurred frame, and when the input frame is the partially-blurred frame, the processor 1310 may obtain a model-based quality score with respect to the partially-blurred frame.

The processor 1310 may obtain a final quality score with respect to a video using time-series data obtained by accumulating the analysis-based quality score and the model-based quality score.

In an embodiment, the image quality processor 1340 may process the frame to improve the quality based on at least one of the analysis-based quality score, the model-based quality score, or the final quality score with respect to the video.

In an embodiment, the image quality processor 1340 may perform various image processing operations such as decoding, rendering, scaling, noise filtering, frame rate transformation, and resolution transformation, on each frame or the entire video (or different sections of the video) using a plurality of AI models to improve the quality. For example, the image quality processor 1340 may independently perform the image processing operations on frames by using different AI models.

In an embodiment, each of the plurality of AI models may be an image reconstruction model capable of outputting a result in which the quality is optimally improved according to a score of each frame or the final quality score of the entire video using one or a plurality of neural networks.

The image quality processor 1340 may select one image reconstruction model from among a plurality of neural network models or directly design such a model according to the score for each frame or the final score of the entire video. In an embodiment, a model corresponding to each score may be predetermined depending on the final score. Each model may be a model trained to process frames with a respective score. For example, model A may be a model for improving the quality of frames having a quality score ranging from 0 to 1, and model B may be a model processing frames having a quality score ranging from 1 to 2. The image quality processor 1340 may improve the quality by processing the frame using the AI model based on the selected neural network.

In an embodiment, the image quality processor 1340 may determine a number of times to apply the image reconstruction model to optimally improve the quality of the frame or the video. The image quality processor 1340 may optimally improve the quality of the frame or the video by repeatedly applying the image reconstruction model to the frame or the video by the determined number of times.

In an embodiment, the image quality processor 1340 may correct various hyperparameter values used in the neural network according to the score for each frame or the final score of the video. The image quality processor 1340 may correct one or more of various hyperparameter values such as a filter size, a filter coefficient, a kernel size, and weight values of nodes according to the score of the frame or the video to select a hyperparameter value for a model having an optimal performance to be applied to the frame or the video. The image quality processor 1340 may optimally improve the quality of the frame or the video using the AI model having such a hyperparameter.

In an embodiment, the image quality processor 1340 may design a filter to perform image reconstruction according to the score. The image quality processor 1340 may design a bandpass filter (BPF) or highpass filter (HPF) having a bandwidth varying according to the score of the frame or the video and process the frame or the video by using a method of changing a signal of a high frequency band in the frame or the video using the designed filter.

The image quality processor 1340 may identify an AI model capable of optimally improving the quality for each frame or with respect to the entire video according to the score of the frame or the video using the above-described various methods. The image quality processor 1340 may optimally improve the quality of the frame or the video by using the AI model.

The display 1330 according to the embodiment may output the frames and the video processed by the image quality processor 1340.

When the display 1330 is implemented as a touch screen, the display 1330 may be used as an input device as well as an output device. For example, the display 1330 may include at least one of a liquid crystal display (LCD), a thin film transistor-liquid crystal display (TFT-LCD), an organic light-emitting diode (OLED), a flexible display, a three-dimensional (3D) display, or an electrophoretic display. In addition, according to embodiments of the image display apparatus 1300, the image display apparatus 1300 may include two or more displays 1330.

As described above, according to an embodiment, the image display apparatus 1300 may obtain a quality score with respect to the frame and use the quality score to select the image reconstruction model suitable for each frame or the entire video. After improving the quality of each frame or video, the image display apparatus 1300 may output the same through the display 1330.

Figure 14:
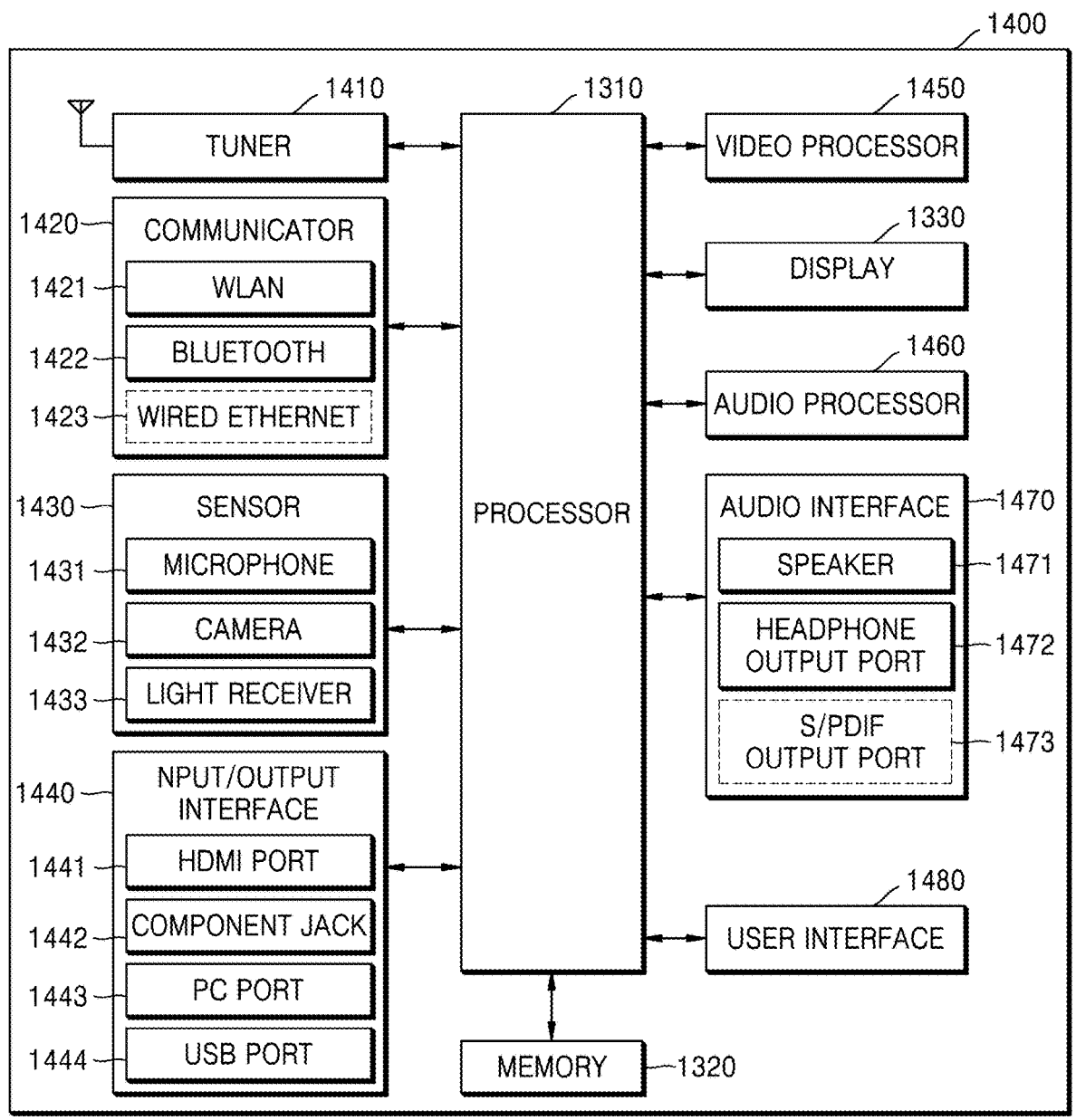
FIG. 14 is a block diagram of an internal structure of an image display apparatus, according to an embodiment

FIG. 14 is a block diagram of an internal structure of an image display apparatus 1400, according to an embodiment. The image display apparatus 1400 of FIG. 14 may include elements of the image display apparatus 1300 of FIG. 13. Accordingly, the same descriptions as those described in FIG. 13 with regard to a processor 1310, a memory 1320, and a display 1330 are omitted.

Referring to FIG. 14, the image display apparatus 800 may include a tuner 1410, a communicator 1420, a sensor 1430, an input/output interface 1440, a video processor 1450, an audio processor 1460, an audio interface 1470, and a user interface 1480, in addition to the processor 1310, the memory 1320, and the display 1330.

The tuner 1410 may tune a frequency of a selected channel from among many radio wave components that are obtained via amplification, mixing, resonance, or the like of wired or wireless broadcasting content. The content received via the tuner 1410 may be decoded and divided into audio, video, and/or additional information. The audio, the video, and/or the additional information may be stored in the memory 1320 under the control by the processor 1310.

The communicator 1420 may connect the image display apparatus 1400 to an external apparatus or a server under the control by the processor 1310. The image display apparatus 1400 may download or web-browse a program or application needed by the image display apparatus 1400 from the external apparatus or the server through the communicator 1420. The communicator 1420 may receive content from the external apparatus.

The communicator 1420 may include one of a wireless local area network (LAN) 1421, a Bluetooth interface 1422, and a wired Ethernet interface 1423 in correspondence to a performance and a structure of the image display apparatus 1400. The communicator 1420 may include a combination of the wireless LAN 1421, the Bluetooth interface 1422, and the wired Ethernet interface 1423. The communicator 1420 may receive a control signal via a control apparatus such as a remote controller, under the control by the processor 1310. The control signal may be implemented as a Bluetooth signal, a radio frequency (RF) signal, or a Wi-Fi signal. The communicator 1420 may further include short-range communication (for example, near field communication (NFC) or Bluetooth low energy (BLE)), in addition to the Bluetooth interface 1422. According to an embodiment, the communicator 1420 may transmit or receive a connection signal to or from the external apparatus or the like through short-range communication such as the Bluetooth interface 1422 or BLE.

The sensor 1430 may sense a voice of a user, an image of the user, or an interaction with the user, and may include a microphone 1431, a camera 1432, and a light receiver 1433. The microphone 1431 may receive an uttered voice of a user, transform the received voice into an electrical signal, and output the electrical signal to the processor 1310. The camera 1432 may include a sensor and a lens and may capture an image formed on the screen. The light receiver 1433 may receive an optical signal (including a control signal). The light receiver 1433 may receive an optical signal corresponding to a user input (for example, touch, pressing, a touch gesture, a voice, or a motion) from a control apparatus such as a remote controller or a mobile phone. A control signal may be extracted from the received optical signal under the control by the processor 1310.

The input/output interface 1440 may receive video (for example, a moving picture signal or a still image signal), audio (for example, a voice signal or a music signal), and additional information (for example, a description of content, a content title, and a content storage location) from a device or the like outside the image display apparatus 1400 under the control by the processor 1310. The input/output interface 1440 may include one of a High-Definition Multimedia Interface (HDMI) port 1441, a component jack 1442, a PC port 1443, and a USB port 1444. The input/output interface 1440 may include a combination of the HDMI port 1441, the component jack 1442, the PC port 1443, and the USB port 1444.

The video processor 1450 may process image data that is to be displayed by the display 1330, and perform various image processing operations such as decoding, rendering, scaling, noise filtering, frame rate transformation, and resolution transformation, on the image data.

In an embodiment, the video processor 1450 may perform a function of the image quality processor 1340 of the image display apparatus 1300 of FIG. 13. That is, the video processor 1450 may improve a quality of a video and/or a frame based on a score for each frame or a final quality score of an entire video obtained by the processor 1310.

For example, the video processor 1450 may select a quality processing model according to the score and accordingly improve the quality of the frame/video.

For example, the video processor 1450 may determine a number of times to apply a quality processing model according to the score, and improve the quality of the frame/video by repeatedly applying the quality processing model to the frame by the determined number of times.

For example, the video processor 1450 may design a filter according to the score and apply the filter to the frame/video to improve the quality of the frame/video.

For example, the video processor 1450 may correct a hyperparameter value according to the score and improve the quality of the frame by using a neural network having the corrected hyperparameter value.

The display 1330 may output, on the screen thereof, content received from a broadcasting station or received from an external server or an external storage medium. The content is a media signal, and thus may include a video signal, an image, a text signal, and the like. The display 1330 may display a video signal or an image received via the HDMI port 1441, on the screen thereof.

In an embodiment, when the video processor 1450 improves the quality of the video or the frame, the display 1330 may output the video or the frame of the improved quality.

When the display 1330 is implemented as a touch screen, the display 1330 may be used as an input device as well as an output device. According to embodiments of the image display apparatus 1400, the image display apparatus 1400 may include two or more displays 1330.

The audio processor 1460 processes audio data. The audio processor 1460 may perform a variety of processing such as decoding, amplification, or noise filtering, on the audio data.

The audio interface 1470 may output audio included in the content received via the tuner 1410, audio that is input via the communicator 1420 or the input/output interface 1440, and audio stored in the memory 1320, under the control by the processor 1310. The audio interface 1470 may include at least one of a speaker 1471, a headphone output port 1472, or a Sony/Philips Digital Interface (S/PDIF) output port 1473.

The user interface 1480 may receive a user input for controlling the image display apparatus 1400. The user interface 1480 may include various types of user input devices including a touch panel that senses a tough of a user, a button that receives a push manipulation of the user, a wheel that receives a rotation manipulation of the user, a keyboard, a dome switch, a microphone for voice recognition, and a motion detection sensor, but is not limited thereto. When the image display apparatus 1400 is manipulated by a remote controller, the user interface 1480 may receive a control signal from the remote controller.

Figure 15:
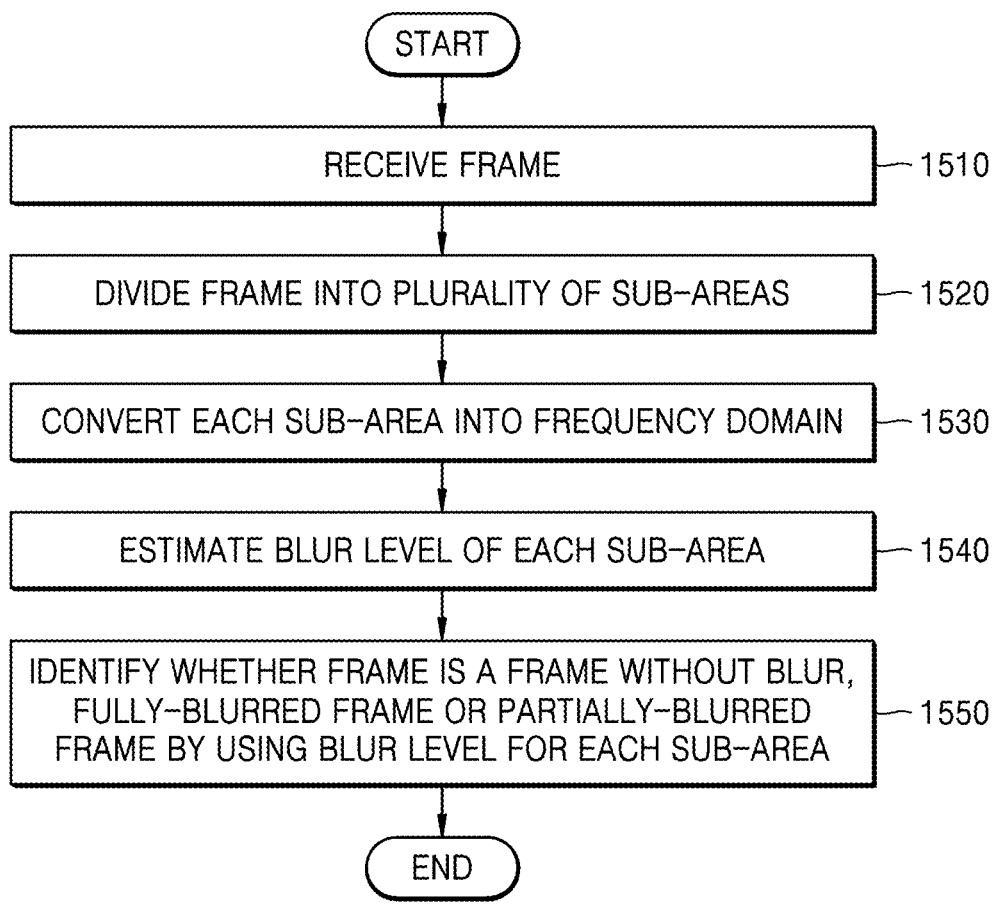
FIG. 15 is a flowchart illustrating a frame identification method, according to an embodiment.

FIG. 15 is a flowchart illustrating a frame identification method, according to an embodiment.

Referring to FIG. 15, the video quality assessment apparatus 130 may receive a frame (operation 1510) and divide the frame into a plurality of sub-areas (operation 1520). The video quality assessment apparatus 130 may convert each of the plurality of sub-areas into a frequency domain (operation 1530).

The video quality assessment apparatus 130 may obtain a power spectrum with respect to a signal in the frequency domain for each sub-area, and obtain a spectral envelope from the power spectrum. The video quality assessment apparatus 130 may estimate a blur level of each sub-area using an inclination value of the spectral envelope or a bin index of a point where an inclination of the spectral envelope rapidly changes (operation 1540).

The video quality assessment apparatus 130 may identify whether the frame is a fully-blurred frame or a partially-blurred frame by using the estimated blur level for each sub-area (operation 1550). The video quality assessment apparatus 130 may identify whether a blurred frame is the fully-blurred frame or the partially-blurred frame based on whether the number of sub-areas having a blur level exceeding a certain reference value is equal to or greater than a certain number.

Figure 16:
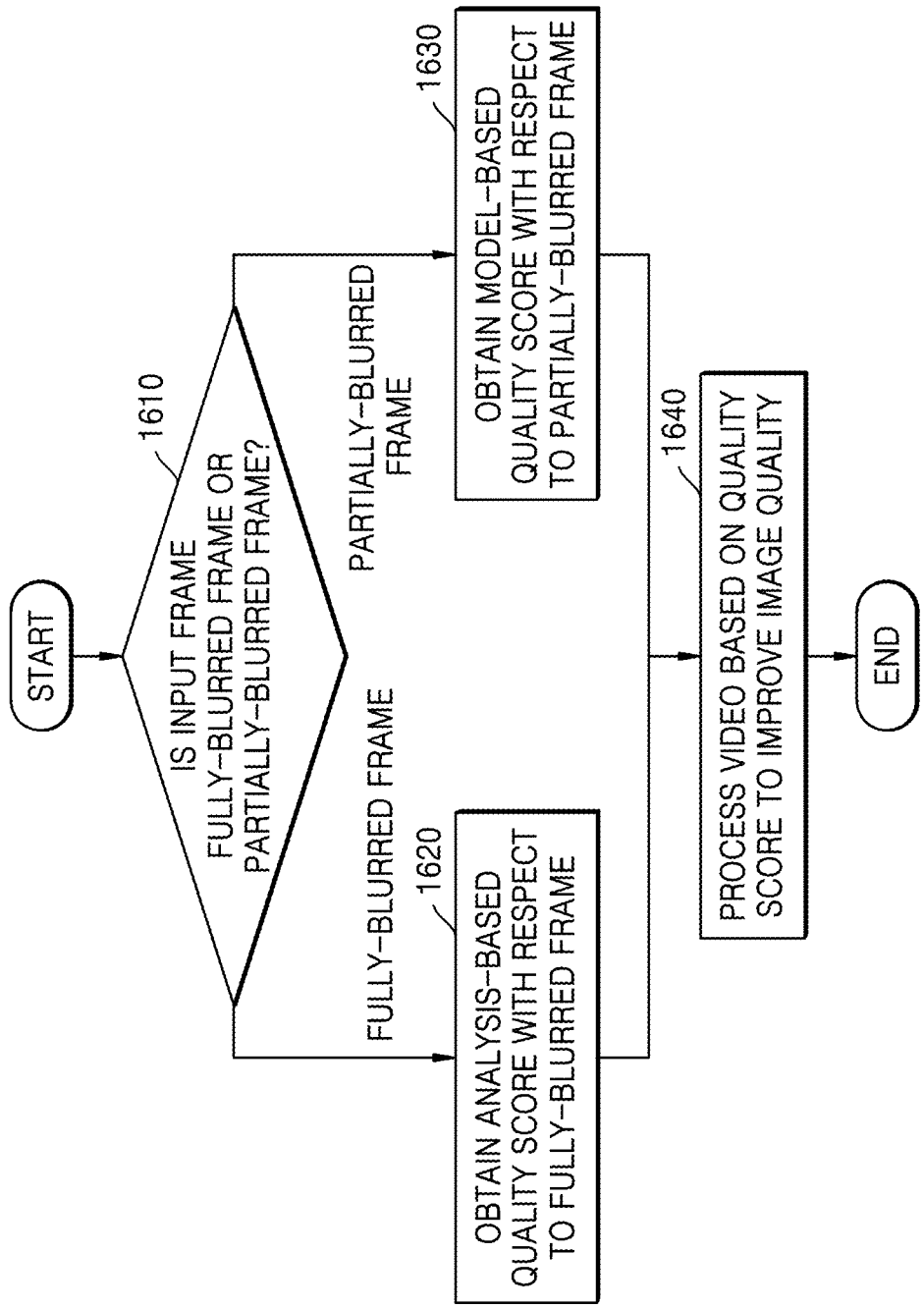
FIG. 16 is a flowchart illustrating a method of obtaining a quality score, according to an embodiment.

FIG. 16 is a flowchart illustrating a method of obtaining a quality score, according to an embodiment.

Referring to FIG. 16, the video quality assessment apparatus 130 may identify whether an input frame is a fully-blurred frame or a partially-blurred frame (operation 1610), and when the input frame is the fully-blurred frame, obtain an analysis-based quality score with respect to the fully-blurred frame (operation 1620).

In an embodiment, the analysis-based quality score may be a score obtained according to a frequency characteristic with respect to the frame.

The video quality assessment apparatus 130 may obtain a spectral envelope distribution feature from a spectral envelope of each of a plurality of sub-areas included in the fully-blurred frame. The spectral envelope distribution feature may include at least one statistical property of a mode, a median, an average, a range, a deviation, a variance, a global minimum, or a global maximum of the spectral envelope.

The video quality assessment apparatus 130 may obtain the analysis-based quality score with respect to the fully-blurred frame by analyzing the spectral envelope distribution feature.

When the input frame is the partially-blurred frame, the video quality assessment apparatus 130 may obtain a model-based quality score with respect to the partially-blurred frame using at least one neural network (operation 1630).

In an embodiment, the model-based quality score may indicate a quality score obtained with respect to the partially-blurred frame using at least one neural network.

The video quality assessment apparatus 130 may process a video to improve a quality thereof by using at least one of the analysis-based quality score obtained with respect to the fully-blurred frame or the model-based quality score obtained with respect to the partially-blurred frame (operation 1640). The video quality assessment apparatus 130 may accumulate scores of frames for a certain period of time and obtain a final score with respect to the video from the scores. The video quality assessment apparatus 130 may perform image quality processing such as compensating for a distortion of the video using the final score.

Figure 17:
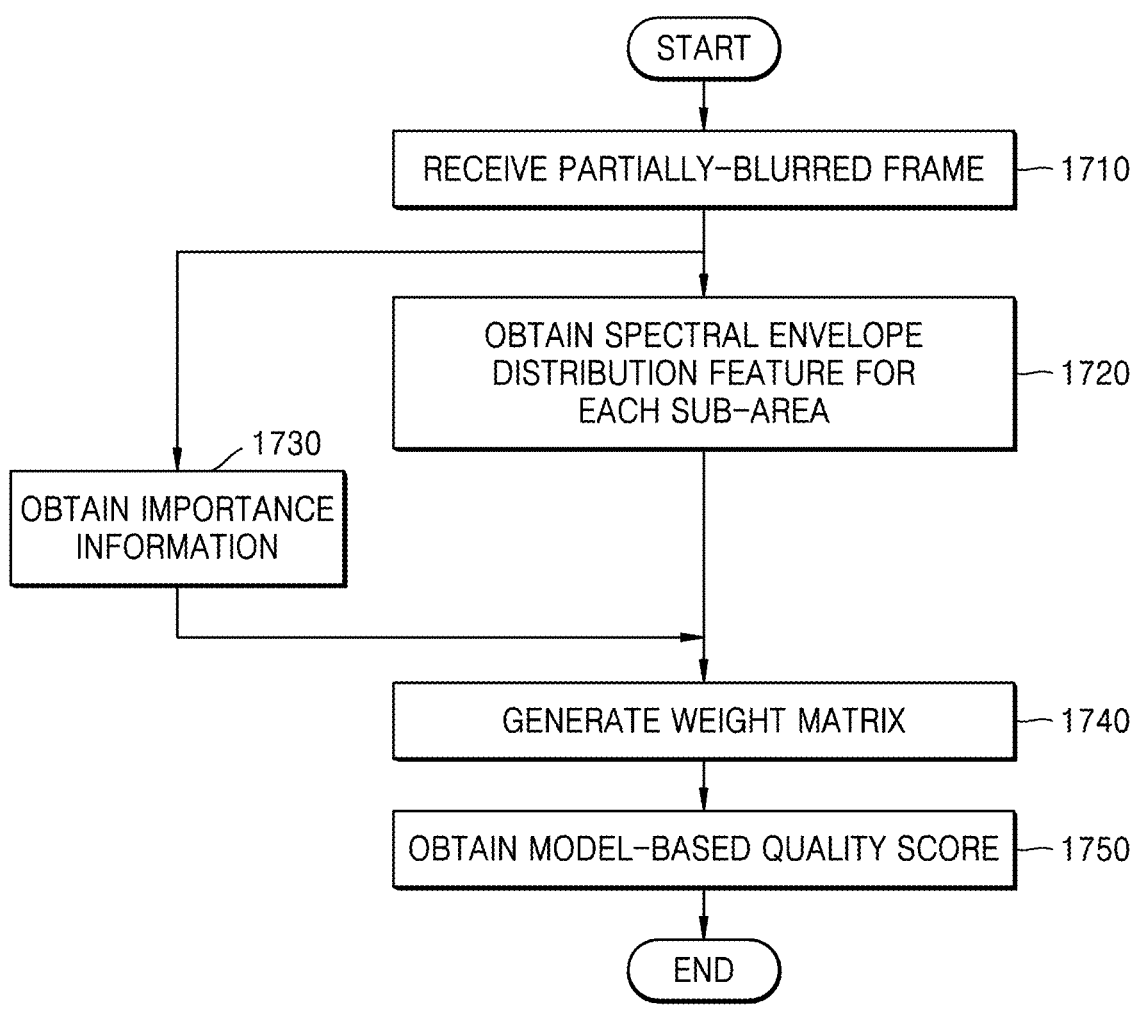
FIG. 17 is a flowchart illustrating a method of obtaining a model-based quality score with respect to a partially-blurred frame, according to an embodiment.

FIG. 17 is a flowchart illustrating a method of obtaining a model-based quality score with respect to a partially-blurred frame, according to an embodiment.

Referring to FIG. 17, when an input frame is the partially-blurred frame (operation 1710), the video quality assessment apparatus 130 may obtain a spectral envelope for each sub-area of the partially-blurred frame, and obtain a spectral envelope distribution feature from the spectral envelope (operation 1720).

In addition, the video quality assessment apparatus 130 may acquire importance information for each sub-area of the partially-blurred frame (operation 1730). The video quality assessment apparatus 130 may obtain importance information related to a factor that may affect a quality score from the partially-blurred frame using at least one neural network. The importance information may include at least one of information on whether an object included in the frame is a foreground or a background, information about a genre to which the frame belongs, semantic information, or location information.

The video quality assessment apparatus 130 may obtain a weight for each sub-area using the importance information for each sub-area and the spectral envelope distribution feature for each sub-area, and obtain a weight matrix with respect to an entire partially-blurred frame from the weight (operation 1740).

The video quality assessment apparatus 130 may obtain the model-based quality score with respect to the partially-blurred frame from the weight matrix and the partially-blurred frame (operation 1750). The video quality assessment apparatus 130 may obtain a feature vector from the partially-blurred frame using at least one neural network, and obtain a feature to which the weight is reflected by using the feature vector together with the weight matrix. The video quality assessment apparatus 130 may obtain the model-based quality score with respect to the partially-blurred frame from the feature to which the weight is reflected.

Figure 18:
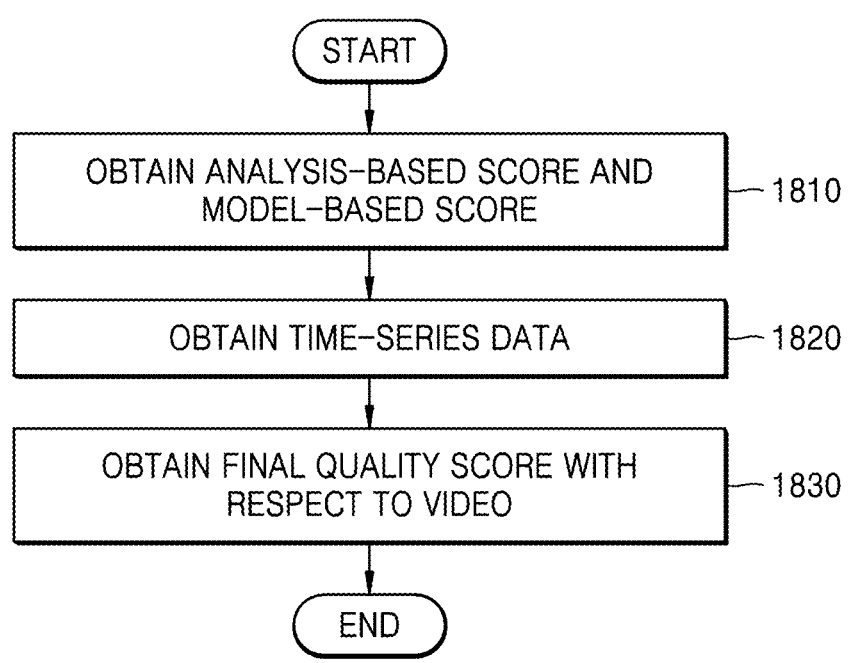
FIG. 18 is a flowchart illustrating a method of obtaining a final quality score, according to an embodiment.

FIG. 18 is a flowchart illustrating a method of obtaining a final quality score, according to an embodiment. Referring to FIG. 18, the video quality assessment apparatus 130 may obtain an analysis-based score and a model-based score (operation 1810), and accumulate the analysis-based score and the model-based score for a certain period of time or by a certain number of frames.

The video quality assessment apparatus 130 may obtain time-series data for a certain period of time or for a certain number of frames by accumulating scores for individual frames together with a time stamp of each frame (operation 1820).

The video quality assessment apparatus 130 may obtain a final quality score with respect to a video by smoothing the time-series data (operation 1830).

The video quality assessment apparatus 130 may obtain a final score with respect to an entire video in consideration of an effect of time on the quality of the video. The video quality assessment apparatus 130 may obtain the final quality score with respect to the entire video from the time-series data using at least one neural network.

FIG. 19 is a flowchart illustrating a method of assessing a video quality, according to another embodiment.

Referring to FIG. 19, the video quality assessment apparatus 130 may receive a blurred frame (operation 1910), and may identify whether an input frame is a fully-blurred frame or a partially-blurred frame (operation 1920).

The video quality assessment apparatus 130 may obtain different features according to a type of the input frame.

When the input frame is the fully-blurred frame, the video quality assessment apparatus 130 may obtain a spectral envelope distribution feature from a spectral envelope obtained for each sub-area of the fully-blurred frame (operation 1930).

When the input frame is the partially-blurred frame, the video quality assessment apparatus 130 may obtain a model-based feature from the partially-blurred frame (operation 1940). The model-based feature is related to a quality of the partially-blurred frame, and may include at least one of a blur-related feature, a motion-related feature, a content-related feature, a perceptual feature, a spatial feature, a deep feature for each layer extracted from a plurality of hidden layers, or features that are statistically extracted from a lower level to an upper level.

The video quality assessment apparatus 130 may obtain importance information that affects a quality assessment for each sub-area from the input frame (operation 1950). The video quality assessment apparatus 130 may obtain a spectral envelope distribution feature for each sub-area of the input frame, and generate a weight matrix from the importance information for each sub-area and the spectral envelope distribution feature for each sub-area (operation 1960).

The video quality assessment apparatus 130 may obtain time-series data by receiving and accumulating the input frame, the spectral envelope distribution feature of the fully-blurred frame, the model-based feature of the partially-blurred frame, and the weight matrix, for a certain period of time. The video quality assessment apparatus 130 may obtain a final quality score with respect to a video from the time-series data (operation 1970).

The video quality assessment method and apparatus according to some embodiments, may be embodied as a storage medium including instruction codes executable by a computer such as a program module executed by the computer. A computer-readable medium may be any available medium which may be accessed by the computer and includes all volatile/non-volatile and removable/non-removable media. The computer-readable medium may be non-transitory. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal, or other transmission mechanism, and includes any information transmission medium.

The video quality assessment method and apparatus according to the above-described embodiments may be implemented as computer program products including a recording medium having stored therein a program for performing the video quality assessment method including receiving a frame included in a video, based on a blur level of the input frame, identifying whether the input frame is a fully-blurred frame or a partially-blurred frame, in correspondence to the input frame that is the fully-blurred frame, obtaining an analysis-based quality score with respect to the fully-blurred frame, in correspondence to the input frame that is the partially-blurred frame, obtaining a model-based quality score with respect to the partially-blurred frame, and processing the video to improve quality thereof using at least one of the analysis-based quality score or the model-based quality score.

The video quality assessment method and apparatus according to an embodiment may identify a case in which a frame is a fully-blurred frame and a partially-blurred frame based on a blur level of the frame included in a video, and in each case, assess the quality in a different manner.

The video quality assessment method and apparatus according to an embodiment may obtain different features from a fully-blurred frame and a partially-blurred frame and assess a quality of each frame using the different features.

The video quality assessment method and apparatus according to an embodiment may obtain importance information and a spectral envelope distribution feature for each sub-area of a frame included in a video, and quantify a video quality using a weight matrix generated from the importance information and the spectral envelope distribution feature, thereby assessing the quality of the frame in consideration of a characteristic for each sub-area of the frame.

The video quality assessment method and apparatus according to an embodiment may assess the quality of a frame using a neural network that has learned a subjective assessment of a human.

While embodiments have been described in detail, it will be understood by one of ordinary skill in the art that various changes in form and details may be made therein without departing from the spirit and scope of the disclosure as defined by the following claims.

What is claimed is:

1. A video quality assessment method comprising:
receiving a frame of a video;
identifying, based on a blur level of the frame, whether the frame is a fully-blurred frame or a partially-blurred frame;
identifying, based on whether the frame is the fully-blurred frame or the partially-blurred frame, whether to obtain an analysis-based quality score using an analysis-based method or a model-based quality score using a model-based method;
obtaining, in response to the frame being the fully-blurred frame, the analysis-based quality score with respect to the fully-blurred frame;
obtaining, in response to the frame being the partially-blurred frame, the model-based quality score with respect to the partially-blurred frame; and
processing the video based on at least one of the analysis-based quality score or the model-based quality score to obtain a processed video,
wherein the analysis-based method and the model-based method are different.

2. The video quality assessment method of claim 1, further comprising:
obtaining a spectral envelope with respect to each of a plurality of sub-areas included in the frame; and
estimating the blur level for each of the plurality of sub-areas based on the spectral envelope,
wherein the identifying whether the frame is the fully-blurred frame or the partially-blurred frame comprises:
identifying a number of the plurality of sub-areas in which the blur level estimated based on the spectral envelope exceeds a first threshold value;
identifying the frame as the fully-blurred frame based on the number exceeding a second threshold value; and
identifying the frame as the partially-blurred frame based on the number not exceeding the second threshold value.

3. The video quality assessment method of claim 2, wherein the obtaining the spectral envelope comprises, for each of the plurality of sub-areas:
obtaining a signal in a frequency domain for a corresponding sub-area;

obtaining a power spectrum with respect to the signal in the frequency domain; and
obtaining the spectral envelope based on the power spectrum.

4. The video quality assessment method of claim 2, wherein the obtaining the analysis-based quality score comprises:
obtaining a spectral envelope distribution feature based on the spectral envelope with respect to each of the plurality of sub-areas included in the fully-blurred frame; and
obtaining the analysis-based quality score with respect to the fully-blurred frame by analyzing the spectral envelope distribution feature with respect to each of the plurality of sub-areas.

5. The video quality assessment method of claim 2, further comprising:
obtaining a spectral envelope distribution feature based on the spectral envelope with respect to each of the plurality of sub-areas included in the partially-blurred frame;
obtaining importance information with respect to each of the plurality of sub-areas included in the partially-blurred frame by using a first neural network; and
generating a weight matrix indicating a weight value for each of the plurality of sub-areas, based on the spectral envelope distribution feature and the importance information obtained with respect to each of the plurality of sub-areas included in the partially-blurred frame,
wherein the obtaining the model-based quality score comprises obtaining the model-based quality score with respect to the partially-blurred frame based on the weight matrix and the partially-blurred frame.

6. The video quality assessment method of claim 5, wherein the obtaining the importance information comprises obtaining for each of the plurality of sub-areas, one or more pieces of importance information related to a factor capable of affecting a quality score by using the first neural network, and
wherein the importance information comprises at least one of information whether an object is a foreground object or a background object, semantic information, location information, or content information.

7. The video quality assessment method of claim 5, wherein the plurality of sub-areas comprises a first sub-area and a second sub-area that is adjacent the first sub-area, and
wherein the video quality assessment method further comprises:
correcting a first spectral envelope distribution feature of the first sub-area by using a second spectral envelope distribution feature of the second sub-area;
correcting first importance information of the first sub-area by using second importance information of the second sub-area; and
obtaining a corrected weight value with respect to the first sub-area by using the first spectral envelope distribution feature as corrected and the first importance information as corrected.

8. The video quality assessment method of claim 5, wherein the obtaining the model-based quality score is performed using a second neural network trained with respect to a correlation between a feature vector and a mean opinion score.

9. The video quality assessment method of claim 8, wherein the obtaining the model-based quality score comprises:

extracting a feature from the partially-blurred frame by using the second neural network; and
obtaining a quality score of the partially-blurred frame based on the feature and the weight matrix, and
wherein the feature comprises at least one of a blur-related feature, a motion-related feature, a content-related feature, a deep feature, a statistical feature, a conceptual feature, a spatial feature, or a modified domain feature.

10. The video quality assessment method of claim 1, further comprising:
accumulating the analysis-based quality score and the model-based quality score for a plurality of frames over a period of time to obtain time-series data; and
smoothing the time-series data to obtain a final quality score.

11. The video quality assessment method of claim 10, wherein the smoothing the time-series data to obtain the final quality score is performed using a third neural network model, and
wherein the third neural network model comprises a long short-term memory (LSTM).

12. The video quality assessment method of claim 10, wherein the processing the video comprises processing the frame based on the final quality score,
wherein the processing the video is performed by at least one of:
processing the video according to a quality processing model selected according to the final quality score,
identifying a number of times to apply the quality processing model based on the final quality score, and repeatedly applying the quality processing model to the frame the number of times,
identifying a filter based on the final quality score, and processing the video by applying the filter to the frame, or
processing the video by using a neural network of a hyperparameter value corrected according to the final quality score.

13. A video quality assessment method comprising:
receiving a frame of a video;
identifying whether the frame is a fully-blurred frame or a partially-blurred frame based on a blur level of the frame;
identifying, based on whether the frame is the fully-blurred frame or the partially-blurred frame, whether to obtain a spectral envelope distribution feature using a first method or a model-based feature using a second method;
obtaining, in response to the frame being the fully-blurred frame, the spectral envelope distribution feature of the fully-blurred frame;
obtaining, in response to the frame being the partially-blurred frame, the model-based feature of the partially-blurred frame;
obtaining a final quality score with respect to the frame based on at least one of the spectral envelope distribution feature or the model-based feature; and
processing the video based on the final quality score to obtain a processed video,
wherein the first method and the second method are different.

14. The video quality assessment method of claim 13, further comprising:
obtaining importance information with respect to each of a plurality of sub-areas included in the frame;

obtaining the spectral envelope distribution feature with respect to each of the plurality of sub-areas included in the frame; and generating a weight matrix with respect to the frame by obtaining a weight for each of the plurality of sub-areas based on the importance information and the spectral envelope distribution feature with respect to each of the plurality of sub-areas, wherein the obtaining the final quality score with respect to the frame comprises: obtaining the final quality score with respect to the frame by using the spectral envelope distribution feature of each of the plurality of sub-areas of the fully-blurred frame, the model-based feature of the partially-blurred frame, and the weight matrix.

15. The video quality assessment method of claim 13, wherein the obtaining the model-based feature comprises extracting at least one of a blur-related feature, a motion-related feature, a content-related feature, a deep feature, a statistical feature, a conceptual feature, a spatial feature, or a modified domain feature from the partially-blurred frame by using at least one neural network.

16. A video quality assessment apparatus comprising:
a memory storing one or more instructions; and
a processor configured to execute the one or more instructions stored in the memory to:
identify whether a frame included in a video is a fully-blurred frame or a partially-blurred frame based on a blur level of the frame;
identify, based on whether the frame is the fully-blurred frame or the partially-blurred frame, whether to obtain an analysis-based quality score using an analysis-based method or a model-based quality score using a model-based method;
obtain, in response to the frame being the fully-blurred frame, the analysis-based quality score with respect to the fully-blurred frame;
obtain, in response to the frame being the partially-blurred frame, the model-based quality score with respect to the partially-blurred frame; and
process the video based on at least one of the analysis-based quality score or the model-based quality score to obtain a processed video,
wherein the analysis-based method and the model-based method are different.

17. The video quality assessment apparatus of claim 16, wherein the processor is further configured to execute the one or more instructions to:
obtain a spectral envelope distribution feature from a spectral envelope with respect to each of a plurality of sub-areas included in the fully-blurred frame; and
obtain the analysis-based quality score with respect to the fully-blurred frame by analyzing the spectral envelope distribution feature with respect to each of the plurality of sub-areas.

18. The video quality assessment apparatus of claim 16, wherein the processor is further configured to execute the one or more instructions to:
obtain a spectral envelope distribution feature based on a spectral envelope with respect to each of a plurality of sub-areas included in the partially-blurred frame;
obtain importance information with respect to each of the plurality of sub-areas included in the partially-blurred frame;
generate a weight matrix indicating a weight value for each sub-area, based on the spectral envelope distribution feature and the importance information obtained with respect to each of the plurality of sub-areas included in the partially-blurred frame; and
obtain the model-based quality score with respect to the partially-blurred frame based on the weight matrix and the partially-blurred frame.

19. The video quality assessment apparatus of claim 16 further comprising an output interface and
wherein, the processor is further configured to control the output interface to provide the processed video to a display panel.

20. The video quality assessment apparatus of claim 19, wherein the output interface comprises the display panel, and the output interface is configured to provide a wired connection between the video quality assessment apparatus and the display panel.

* * * * *